US012442851B2

(12) United States Patent
Krishnamoorthy et al.

(10) Patent No.: US 12,442,851 B2
(45) Date of Patent: Oct. 14, 2025

(54) SYSTEMS AND METHODS FOR REMAINING USEFUL LIFE PREDICTION IN ELECTRONICS

(71) Applicants: University of Houston System, Houston, TX (US); The United States of America, as represented by the Secretary of the Navy, Arlington, VA (US)

(72) Inventors: Harish Krishnamoorthy, Missouri City, TX (US); Joshua Hawke, Bloomington, IN (US)

(73) Assignees: UNIVERSITY OF HOUSTON SYSTEM, Houston, TX (US); THE GOVERNMENT OF THE UNITED STATES OF AMERICA, AS REPRESENTED BY THE SECRETARY OF THE NAVY, Arlington, VA (US)

( * ) Notice: Subject to any disclaimer, the term of this patent is extended or adjusted under 35 U.S.C. 154(b) by 328 days.

(21) Appl. No.: 17/961,803

(22) Filed: Oct. 7, 2022

(65) Prior Publication Data

US 2023/0160950 A1     May 25, 2023

Related U.S. Application Data

(60) Provisional application No. 63/253,691, filed on Oct. 8, 2021.

(51) Int. Cl.
    *G01R 31/26*      (2020.01)
    *G01R 31/28*      (2006.01)
    *G01R 31/64*      (2020.01)

(52) U.S. Cl.
     CPC ..... *G01R 31/2621* (2013.01); *G01R 31/2834* (2013.01); *G01R 31/2837* (2013.01);
(Continued)

(58) Field of Classification Search
None
See application file for complete search history.

(56) References Cited

U.S. PATENT DOCUMENTS

| 2014/0103937 A1 | 4/2014 | Khan et al. |
| 2017/0117813 A1 | 4/2017 | Lee |
| 2017/0160338 A1 | 6/2017 | Connor et al. |

FOREIGN PATENT DOCUMENTS

FR        3054885        2/2018

OTHER PUBLICATIONS

Wang et al., "Design for Reliability of Power Electronic Systems", IEEE, 2012, 12 pages.
(Continued)

*Primary Examiner* — Walter L Lindsay, Jr.
*Assistant Examiner* — Geoffrey T Evans
(74) *Attorney, Agent, or Firm* — Jackson Walker LLP; Christopher J. Rourk

(57) ABSTRACT

The systems and methods described herein are for remaining useful life prediction in electronics and include measuring a plurality of circuit parameters for each of a plurality of circuit components at a plurality of different temperatures, determining a probability density function of failure as a function of time for each of the plurality of circuit components and combining the probability density functions for each of the plurality of circuit components as a function of a circuit that contains the plurality of circuit components.

19 Claims, 22 Drawing Sheets

(52) U.S. Cl.
CPC ..... *G01R 31/2844* (2013.01); *G01R 31/2846* (2013.01); *G01R 31/64* (2020.01)

(56) References Cited

OTHER PUBLICATIONS

Wang, et al., "Transitioning to Physics-of-Failure as a Reliability Driver in Power Electronics", IEEE Journal of Emerging and Selected Topics in Power Electronics, vol. 2, No. 1, Mar. 2014, 18 pages.
Yang, et al., "An Industry-Based Survey of Reliability in Power Electronic Converters", IEEE, 2009, 7 pages.
Biglarbegian, et al., "On Condition Monitoring of High Frequency Power GaN Converters with Adaptive Prognostics", IEEE, 2018, 8 pages.
Erturk, et al., "Real-Time Aging Detection of SiC MOSFETs", IEEE Transactions on Industry Applications, vol. 55, No. 1, Jan./Feb. 2019, 10 pages.
Medjaher, et al., "Remaining Useful Life Estimation of Critical Components With Application to Bearings", IEEE Transactions on Reliability, vol. 61, No. 2, Jun. 2012, 11 pages.
Gupta, et al., "A Review of Degradation Behavior and Modeling of Capacitors", (Reprint) North Dakota State University, National Renewable Energy Laboratory, Conference Paper NREL/CP-5400-71386, Oct. 2018, 13 pages.
Amaral, "An Experimental Technique for Estimating the ESR and Reactance Intrinsic Values of Aluminum Electrolytic Capacitors", IEEE, 2006, 6 pages.
Laadjal, et al., "Online Estimation of Aluminum Electrolytic-Capacitor Parameters Using a Modified Prony's Method", IEEE Transactions on Industry Applications, vol. 54, No. 5, Sep./Oct. 2018, 11 pages.
Ren, et al., "An Online ESR Estimation Method for Output Capacitor of Boost Converter", IEEE Transactions on Power Electronics, vol. 34, No. 10, Oct. 2019, 13 pages.
Beczkowski, et al., "Online Vce Measurement Method for Wear-Out Monitoring of High Power IGBT Modules", Proceedings of the 15th European Conference on Power Electronics and Applications, EPE 2013, 7 pages.
Dusmez, et al., "Remaining Useful Lifetime Estimation for Thermally Stressed Power MOSFETs Based on ON-State Resistance Variation", IEEE Transactions on Industry Applications, vol. 52, No. 3, May/Jun. 2016, 10 pages.
Levenberg, et al., "A Method for the Solution of Certain Non-Linear Problems in Least Squares", Quarterly of Applied Mathematics, vol. 2, No. 2, Jul. 1944, pp. 164-168.
Erickson, "Steady-State Equivalent Circuit Modeling, Losses, and Efficiency", Fundamentals of Power Electronics: Second Edition, 2000, pp. 39-41.
Middlebrook, et al., "A General Unified Approach to Modeling Switching-Converter Power Stages", 1976 IEEE Power Electronics Specialists Conference, 1976, pp. 18-34.
Van Dijk, et al., PWM-Switch Modeling of DC-DC Converters, IEEE Transactions on Power Electronics, vol. 10, No. 6, Nov. 1995, 7 pages.
Yang, et al., "Condition Monitoring for Device Reliability in Power Electronic Converters: A Review", IEEE Transactions on Power Electronics, vol. 25, No. 11, Nov. 2010, 19 pages.
Vazquez, et al., "Model Predictive Control: A Review of Its Applications in Power Electronics", IEEE Industrial Electronics Magazine, Mar. 19, 2014, 16 pages.
Schluse, et al., "Experimentable Digital Twins—Streamlining Simulation-Based Systems Engineering for Industry 4.0", IEEE Transactions on Industrial Informatics, vol. 14, No. 4, Apr. 2018, 10 pages.
Peyghami, et al., "A Guideline for Reliability Prediction in Power Electronic Converters", IEEE Transactions on Power Electronics, vol. 35, No., 10, Oct. 2020, 11 pages.
Zhang, et al., "Mission Profile-Based System-Level Reliability Prediction Method for Modular Multilevel Converters", IEEE Transactions on Power Electronics, vol. 35, No. 7, Jul. 2020, 15 pages.
Ma, et al., "Prediction and Validation of Wear-Out Reliability Metrics for Power Semiconductor Devices with Mission Profiles in Motor Drive Application", IEEE Transactions on Power Electronics, vol. 33, No. 11, Nov. 2018, 11 pages.
Notification of the International Preliminary Report on Patentability mailed Apr. 18, 2024 for PCT/US22/46036, containing the Written Opinion of the International Search Authority—The European Patent Office, 8 pages.
International Search Report and The Written Opinion of the International Search Authority—The European Patent Office—mailed Oct. 27, 2023, for PCT/US22/46036, 12 pages.
Notification of the International Preliminary Report on Patentability mailed Apr. 18, 2024 for PCT/US22/46024, containing the Written Opinion of the International Search Authority—The European Patent Office, 9 pages.
International Search Report and The Written Opinion of the International Search Authority—The European Patent Office—mailed Dec. 7, 2023, for PCT/US22/46024, 14 pages.
Sadat, et al., "Measure Theory-based Approach for Remaining Useful Lifetime Prediction in Power Converters", IEEE, 2020, pp. 2541-2547.
Magnien, et al., "Temperature Sensitive Electrical Parameter Sensing Unit", IEEE/Therminic, 2019, pp. 1-5.

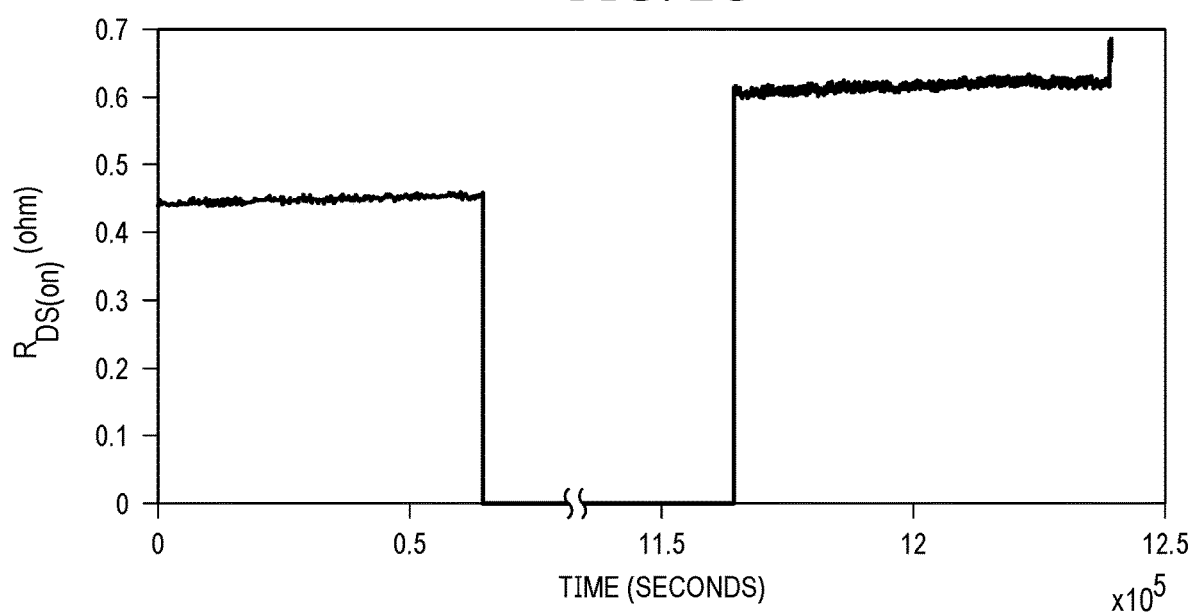

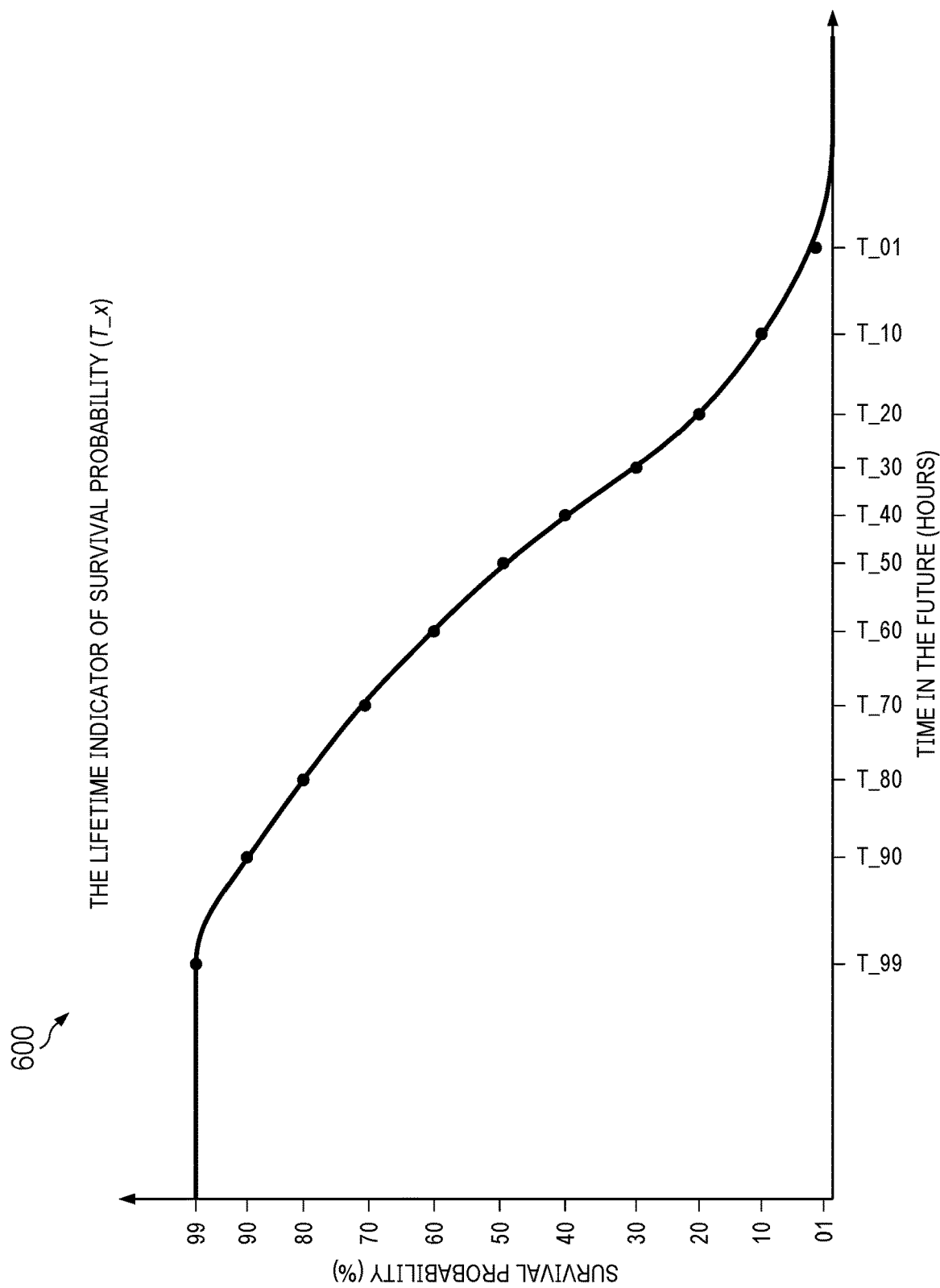

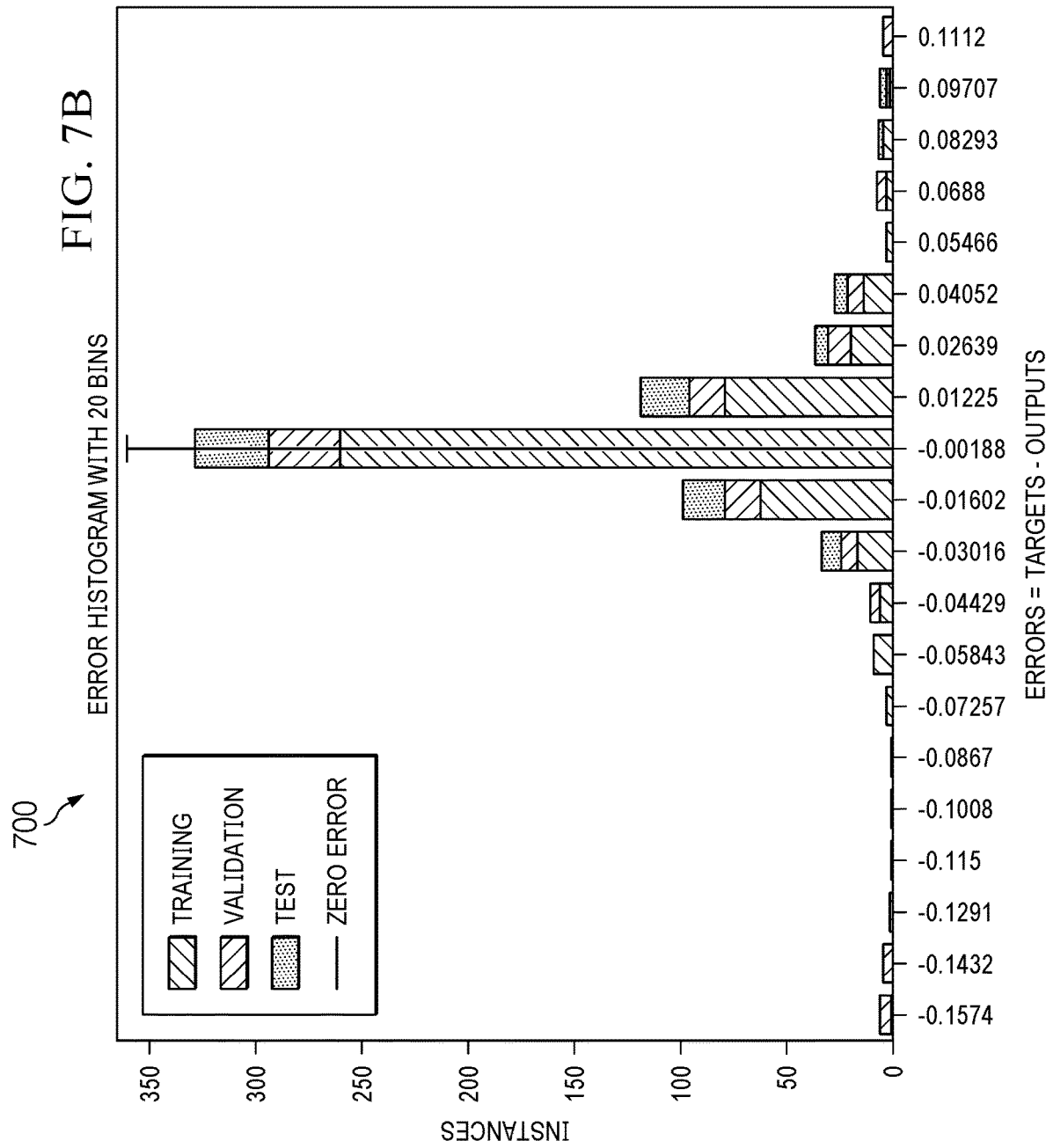

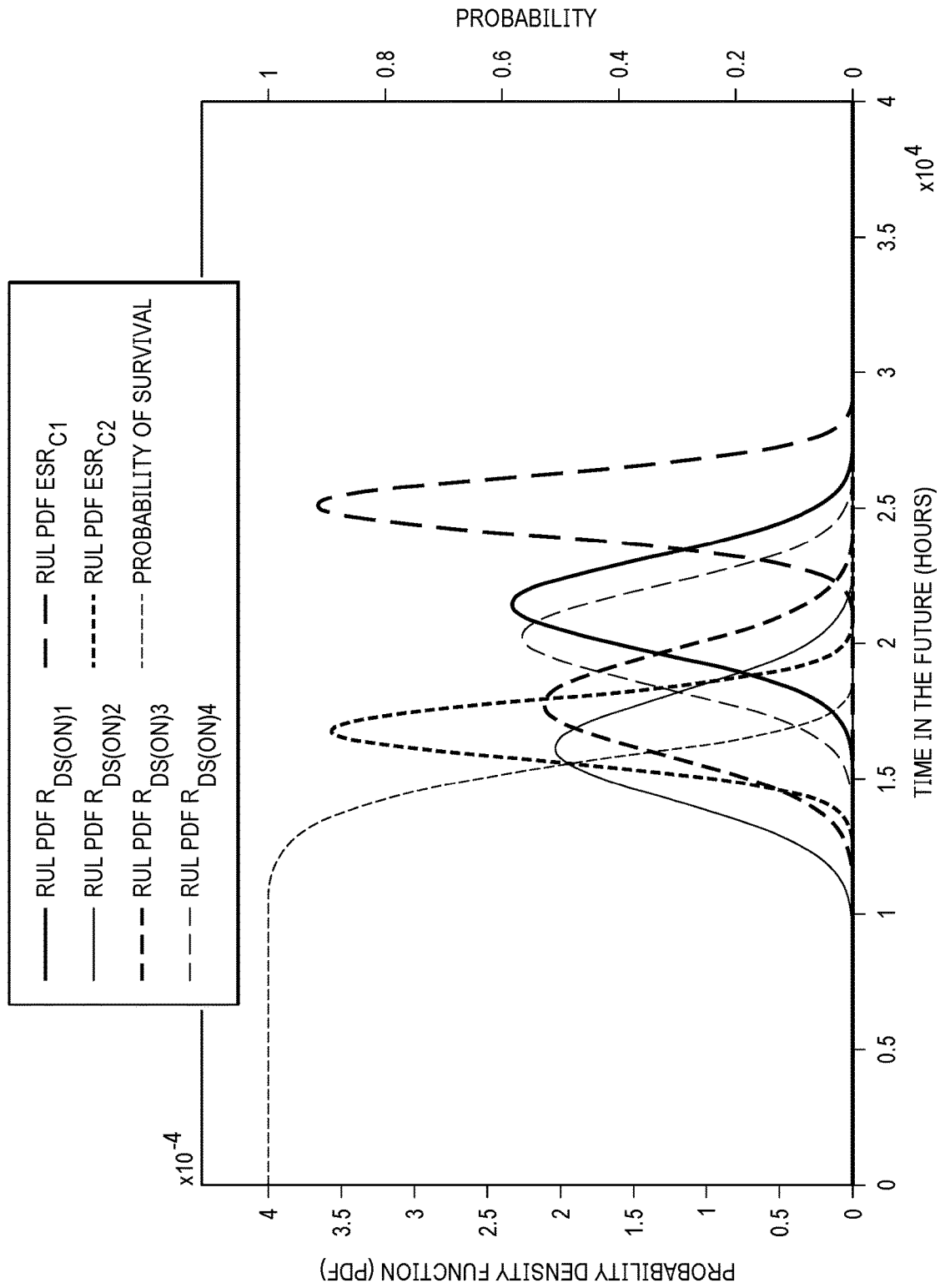

SYSTEMS AND METHODS FOR REMAINING USEFUL LIFE PREDICTION IN ELECTRONICS

RELATED APPLICATIONS

This application claims benefit of and priority to U.S. provisional patent application 63/253,691, filed Oct. 8, 2021, which is hereby incorporated by reference for all purposes as if set forth herein in its entirety.

STATEMENT OF GOVERNMENT RIGHTS

This invention was made in the performance of a Cooperative Research and Development Agreement with the Naval Surface Warfare Center, Crane Division (NCRADA-NSWCCD-18-292). The Government of the United States has certain rights in the invention pursuant to Contract No. W52P1J-20-9-3005 between the Department of the Navy and the University of Houston-Cullen College of Engineering.

BACKGROUND

This disclosure pertains to systems and methods for remaining useful life predictions in electronics.

SUMMARY

The present disclosure relates generally to systems and methods for remaining useful life (or RUL) predictions in electronics, and includes measuring a plurality of circuit parameters for each of a plurality of circuit components at a plurality of different temperatures, humidity levels, voltages, vibration levels, or other stressors, determining a probability density function of RUL as a function of time for each of the plurality of circuit components and combining the probability density functions for each of the plurality of circuit components as a function of a circuit that contains the plurality of circuit components, to calculate the 'probability of survival' or as an extension, 'probability of failure' of the circuit or converter.

For example, the present disclosure relates to systems and methods to enable in-situ health monitoring in power converters, component qualification at multiple operating conditions of a power converter's mission profile, a statistical approach using probability density functions (PDFs) and associated concepts in measure theory to predict the probability of system failure using individual components' qualification data, statistical techniques such as Scenario-Probability Distributions and Point Process to incorporate the effects of mission profile in the system's RUL, machine learning (ML) based models for in-situ digital twin and RUL prediction that can be implemented using Field Programmable Gate Arrays (FPGAs), Application Specific Integrated Circuits (ASICs) or Graphics Processing Units (GPUs) and other important technical features as discussed and disclosed further herein.

BRIEF DESCRIPTION OF THE DRAWINGS

FIGS. 2A-C are diagrams of waveforms in accordance with an example embodiment of the present disclosure;

FIG. 6 is a diagram of a lifetime indicator of survival probability ($T_{-x}$), in accordance with an example embodiment of the present disclosure;

FIGS. 7A-B are diagrams of an evaluation process from training/test data for the trained ANN, in accordance with an example embodiment of the present disclosure;

FIGS. 8A-F show three different comparisons between calculated survival probability by the proposed algorithm and predicted survival probability for a converter with the trained ANN, respectively, with different values for $R_{DS(ON)}$ and ESRs.

DETAILED DESCRIPTION OF PREFERRED EMBODIMENTS

Figure 1A:
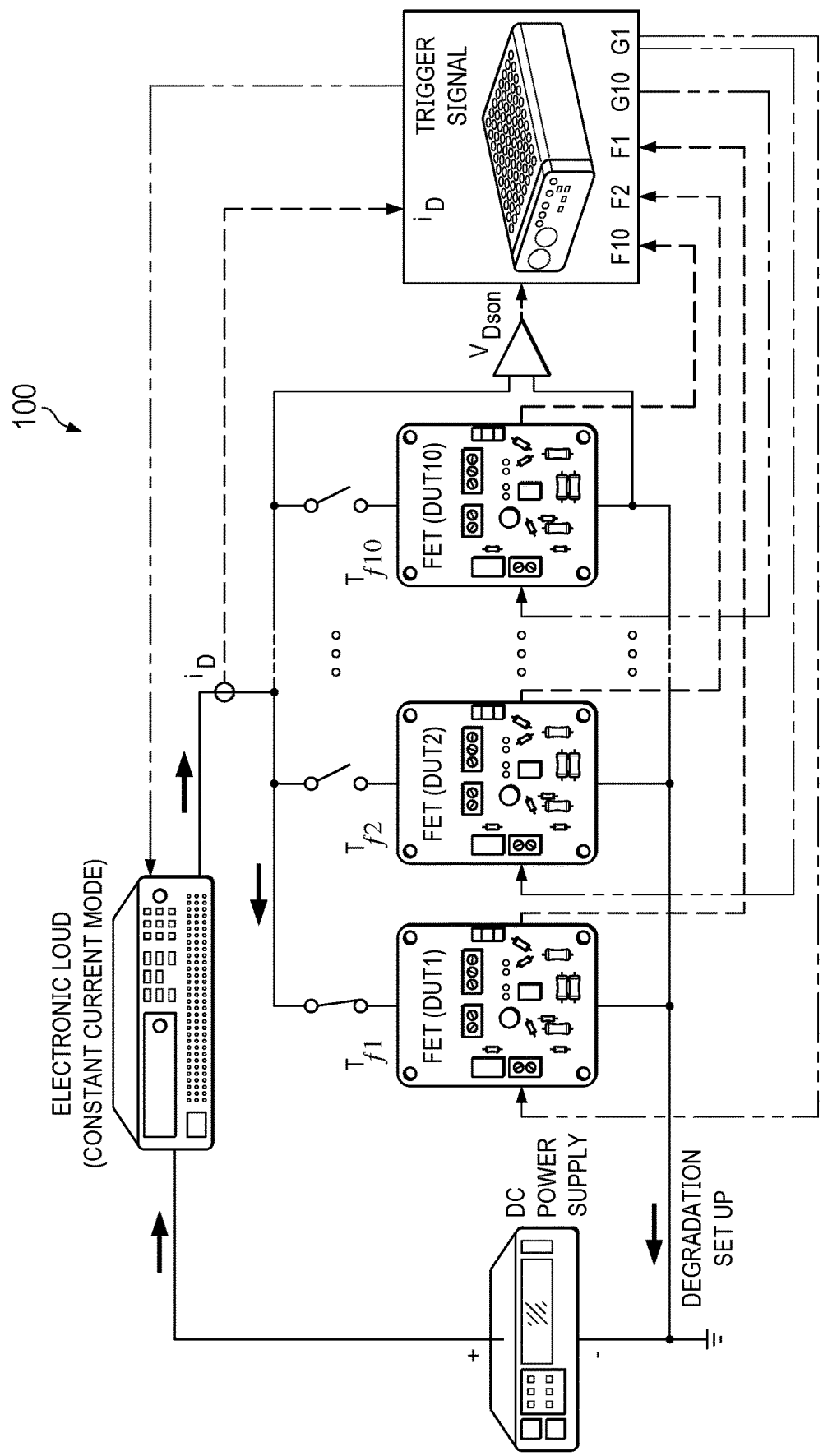
FIGS. 1A-C are diagrams of an experimental test setup for FET degradation that is used to derive a dataset for the reliability evaluation, in accordance with an example embodiment of the present disclosure.

The present disclosure relates to systems and methods for predicting remaining useful life in electronics. T-model, Pi-Model, PWM switch model, DC transformer model, averaged model and other suitable models can be used for the analysis of electronics, specifically power converters. These models make it possible to estimate the performance, losses, transfer function, and other parameters of a circuit even before the circuit is physically built. The disclosed systems and methods can form the core of simulation tools. As electronics become faster, smaller and cheaper, there is a need to improve the reliability, resiliency and performance across various applications. Hence, there is a need for additional developments in modeling and analysis of electronics, and even more so in power converters, which take an entirely new holistic design approach based on mission profile (or operating profile).

Several model-based techniques can be used to predict the reliability of power converters, including the use of analytics to interpret system characteristics and performance. A custom accelerated aging platform for power FETs can use a data-driven approach to estimate the remaining useful lifetime (RUL) of a power device. The power devices can be silicon carbide (SIC) FETs, gallium nitride (GaN) FETs, silicon (Si) FETs, etc. The present disclosure can also or alternatively be used for power converters using other types of devices, such as insulated gate bipolar transistors (IGBTs), thyristors and diodes. A system and method for reliability evaluation of power converters can be based on on-line monitoring of a particular parameter variation over time and deploying Bayesian algorithm for data exploitation. Degradation monitoring of FETs and an early warning method to detect aging can be performed. A RUL estimation technique for the critical component in a system can be used for motor bearings. These techniques can be used to enhance implementation of 'digital twins' for power converters, to develop systems with better performance and reliability. However, there are limitations to existing approaches:

(a) Qualification tests are usually performed at room temperature or at fixed test conditions; but do not always consider the mission profile, which usually requires test data under different operating conditions (say voltage, current, temperature, etc.);

(b) Once the failure data are collected from qualification tests, the actual RUL estimation using the monitoring process is usually based on the worst case component failure time. This is often a conservative approach and will either result in underutilization of parts or in a large inventory, if replacement parts are procured much earlier than when the existing ones fail;

(c) In order to assess the RUL of the complete system as a function of time and mission profile, it is not sufficient to address just one 'most critical' component, but the cumulative characteristics of all the components must be considered that can constitute a system failure;

(d) In order to identify any anomalies in the converter performance, it is not efficient to employ multiple computers to implement digital twins for individual converter modules; it may only be practical to have a central computer system to develop digital equivalent for the complete system;

(e) Digital twin requires data from sensors in different converter modules to be sent to the central system for analysis and decision making, which are susceptible to noise, delays and cyber-attacks.

This disclosure solves the above problems, such as by providing: (i) a suitable system and method to enable in-situ health monitoring in power converters, (ii) component qualification at multiple operating conditions of a power converter's mission profile, (iii) a statistical approach using probability density functions (PDFs) and associated concepts in measure theory to predict the probability of system failure using individual components' qualification data, (iv) statistical techniques such as Scenario-Probability Distributions and Point Process to incorporate the effects of mission profile in the system's RUL, (v) machine learning (ML) based models for in-situ digital twin and RUL prediction that can be implemented using FPGAs (or ASICs, GPUs, etc.), and other example embodiments as discussed and disclosed herein.

The present disclosure further includes:

1) Systems and methods in the appropriate sequence, which lead to the prediction of the RUL or health of the electronics assembly or sub-assembly (here, power converter system) along with an indication of the respective probabilities of survival for different mission profiles (or operating conditions).

2) Systems and methods used to pre-process the probabilities of survival with an offline computing facility (or equipment), and using machine learning/neural networks (or other techniques such as regression) to build an equivalent model that is light enough to be implemented on FPGAs or GPUs or other in-situ devices.

3) The model's inputs can include the 'health indicators' (such as sensed values of capacitor ESR, FET on-state resistance, temperature or on-state collector-emitter voltage of insulated gate bipolar transistors or IGBTs, etc.), 'mission profile information' (such as sensed values of temperature, humidity, accelerations/vibrations, current, etc.). The model's output can include the health status of the electronics system, which can be represented as the RUL (in hours, months, etc.) for different probabilities of survival (such as 99%, 90%, 50%, 10%, etc.) or be represented in a different format such as "Percentage of RUL".

4) The output of the model can be displayed on an in-situ or distant equipment such as laptop/PC, LCD/LED displays, etc. The output can also be transmitted over any other communication method, such as Bluetooth, WiFi, wires, etc. This representation can be used to enable operators/warfighters/engineers, etc. to understand the status of the electronics system to make cognitive decisions about their status, performance, repair, maintenance, replacement or other operations. This approach can also enable logistics/supply chain personnel to assess the stock and manage the inventory.

5) All the above systems and methods can be extended to mechanical, infrastructure or other systems/equipment, via sensing some other health indicators (or parameters) such as pressure.

6) All the above systems and methods can be extended to several other 'smart and connected' applications. One example is in the dynamic determination of the warranty of cars, household equipment, etc. Several modern systems (such as cars or smart devices) are inter-connected and also have some intelligence built inside them. By monitoring certain system parameters online as health indicators, the manufacturers or other entities can track the system degradation (or deterioration) by being able to predict the RUL. Thereby, more appropriate numbers regarding equipment warranty can be decided.

7) The probability density functions can be assumed to follow different types of distributions (as appropriate), such as uniform, gradient extreme value (GEV), normal, beta, skewed normal, etc.

8) Multiple approaches of machine learning techniques can be followed, such as Bayesian Regularization, Random Forest, etc.

9) The component or sub-assembly qualification process can be based on thermal cycling, accelerated thermal and vibrations, humidity, etc. Methods such as Scenario-Probability Distributions and Point Process can be used to relate the mission profile with the qualification data.

10) The systems and methods are scalable-components to devices, devices to sub-assemblies, sub-assemblies to assemblies, assemblies to larger systems, etc.

The present disclosure provides an interdisciplinary approach that incorporates statistics, machine learning, reliability engineering, electronics, etc. Reliability distributions are derived from real qualification data, which was not previously used to derive conclusions beyond the device level to the system level.

In one example embodiment, the reliability of each component in a power converter affects the reliability of the overall system. Due to the advancements in computing infrastructure and sensor technologies, data-driven approaches for the prediction of the health of power converters in real-time are slowly becoming popular. This disclosure provides a new statistical approach using probability density functions (PDFs) and associated concepts in measure theory to predict the probability of system failure using individual components' degradation data. For this purpose, remaining-useful-life (RUL) is estimated for each power component (or sub-system) using qualification data, followed by an evaluation of a cumulative probability of survival for the converter. An artificial neural network (ANN) is then trained to quickly estimate in real-time, the probability of survival of the power converter in the future. While the algorithm involves multiple computation steps, the RUL prediction accuracy using this example embodiment of the system and method can be high due to the data-driven approach. Moreover, the machine learning-based model resulting from this approach to predict the probability of survival is light on memory utilization. It is envisioned that this approach can be used to create digital twins of power converters in practical circuits, optimize performance, and predict RUL. This disclosure explains a practical approach as shown by an example analysis of an isolated DC-DC converter. An experimental qualification setup for device degradation test and system-level RUL measurement systems and methods are provided.

Power semiconductor devices and electrolytic capacitors are usually the most vulnerable components to fail in a power converter system. The failure mechanisms of power electronics are complicated and are affected by many factors. It has been revealed that thermal cycling, i.e., temperature swings inside or outside the components, is one of the critical causes of failure in the power electronics system. The failure of any of these components may lead to shutting down of the whole system, which not only affects safety but also increases operational cost.

Several model-based techniques can be used to predict the reliability of power converters, including the use of analytics to interpret system characteristics and performance. A custom accelerated aging platform for power FETs can use a data-driven approach to estimate the remaining-useful-life (RUL) of a power device. A new system and method for reliability evaluation of power converters is based on on-line monitoring of a parameter variation over time and deploying the Bayesian algorithm for data exploitation. Degradation monitoring of silicon carbide MOSFETs and an early warning method can be used to detect aging. An RUL estimation technique for the critical component in a system can be used for motor bearings.

However, there are several limitations to existing approaches: (a) Once the failure data are collected from degradation tests, the actual RUL estimation using the monitoring process is usually based on the worst-case component failure time, which is often a conservative approach and will either result in underutilization of parts or in a large inventory; and (b) In order to assess the RUL of the complete system as a function of time and mission profile, it is not enough to address just one 'most critical' component, but the cumulative characteristics of all the components must be considered that can constitute a system failure. Considering the necessity of having a system-level health monitoring index, different methods and algorithms are applied to different datasets. The artificial neural network (ANN) is known as universal function approximators, which can approximate any given nonlinear input/output data relationship with arbitrary precision.

A new system and method is disclosed for evaluating the survival index (system-level RUL) of power converters. This system and method aims to address the above issues by developing a statistical approach using probability density functions (PDFs) and associated concepts in measure theory to predict the probability of system failure using individual components' qualification data. Focusing on system-level operation provides a new real-time reliability prediction approach using ANN-based for power FET devices and power converters. Some advantages of the present disclosure are:

Measure theory-based algorithm uses data obtained via actual qualification of device samples, in various ambient temperatures and under different power levels.

The proposed algorithm can be applied for other power converters or any system in general, that consist of multiple critical sub-systems or components.

Evaluating probability of survival of power converters with on-line monitoring of health indicator variations over the time using a machine-learning-based approach Drain-source on-resistance ($R_{DS(ON)}$) value estimation considers the fast switching performance of the devices during ON time via a drain-source on-voltage ($V_{DS(ON)}$) measurement circuit.

Usage of component-level RUL indices for power FETs, capacitors and other critical components.

Simple ANN model resulting from this approach to predict the probability of survival index is light in computational memory usage and can be implemented on GPUs, FPGAs, or other suitable devices.

II. DATA COLLECTION AND COMPONENT-LEVEL RUL

Prediction for Converter System-Level RUL Prediction

A power conversion system consists of several components, including FETs, capacitors, etc., where each has its own reliability function. The system-level RUL prediction algorithm should represent the real-time interaction between the reliability of all individual components with each other to evaluate the health indicator (or survival index) under various operating conditions. Therefore, measure theory can be used to develop a general approach to estimate the system RUL. The first step is the data collection via component-level qualification test. In this disclosure, a full bridge topology is chosen as the system-level converter for RUL evaluation. As mentioned earlier, the methodology is not restricted to a specific power converter and can be applied with different systems and topologies.

Capacitors, especially aluminum electrolytic (AECs) are some of the most age—affected components in power electronic converters. Since AECs are major cause for power electronics equipment breakdown, therefore their reliability is of major concern. Throughout the life of AECs, the equivalent series resistance (ESR) increases due to the loss of the electrolyte. Industry defined standards specify the end-of-life threshold for an electrolytic capacitor as a 10% to 20% decrement in capacitance and 200% or more increment in the ESR value from its initial rated value. Experimental and real-time techniques are used to determine the reactance and ESR intrinsic values of aluminum electrolytic capacitors. An available dataset for ESR can be used in the proposed RUL prediction algorithm.

In one example embodiment, SCT2280KEC SiC-FET can be the power DUT (device-under-test), but the system and method itself can be applied for other types of power devices. For power switches, the junction temperature and $R_{DS(ON)}$ of DUT are usually the temperature-sensitive-electrical-parameters (TSEP) or health indicators to represent the degradation of the device. The present disclosure can begin with the component-level qualification and degradation data collection involving 'n' samples for each component (SiC-MOSFET, capacitor, etc.). For simplicity purposes, this disclosure considers the approach and algorithm only with regards to SiC-FETs and capacitors, where increase in $R_{DS(ON)}$ and ESR values are chosen as health indicators of lifetime performance, respectively. The detailed procedure for component-level characterization (or qualification) is described as follows. Other qualification systems and methods and health indicators can also be used, depending on the component.

To estimate $R_{DS(ON)}$ during degradation test, the $V_{DS(ON)}$ can be monitored and captured using an improved measurement circuit. A $V_{CE}$ measurement circuit for IGBT devices cannot be used for SiC devices practically due to faster switching speeds. A diode should turn off faster than DUT to protect op-amp from overvoltage during DUT off-time operation. The turn-off time for SiC-MOSFETs and Schottky diodes is in the range of nanoseconds, which means both will turn off at the same time. Therefore, for SiC-MOSFET $R_{DS(ON)}$ estimation, over-voltage protection via two ZENER diodes with inverting and non-inverting pins of the op-amp are added to clamp pin voltages at constant levels. The disclosed algorithm is based on calculating the RUL for each component with captured data during the degradation process.

Figure 1B:
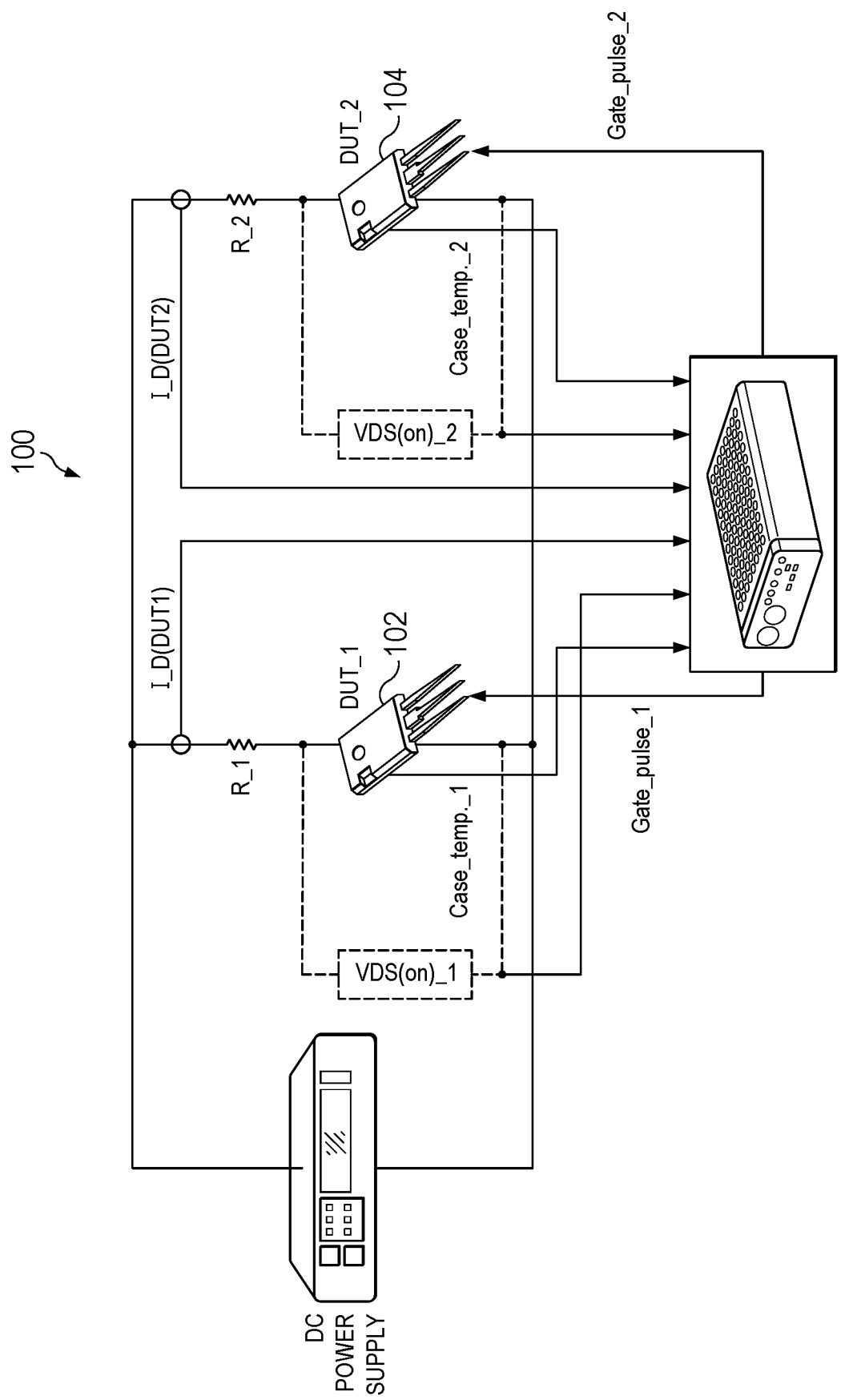
Figure 1C:
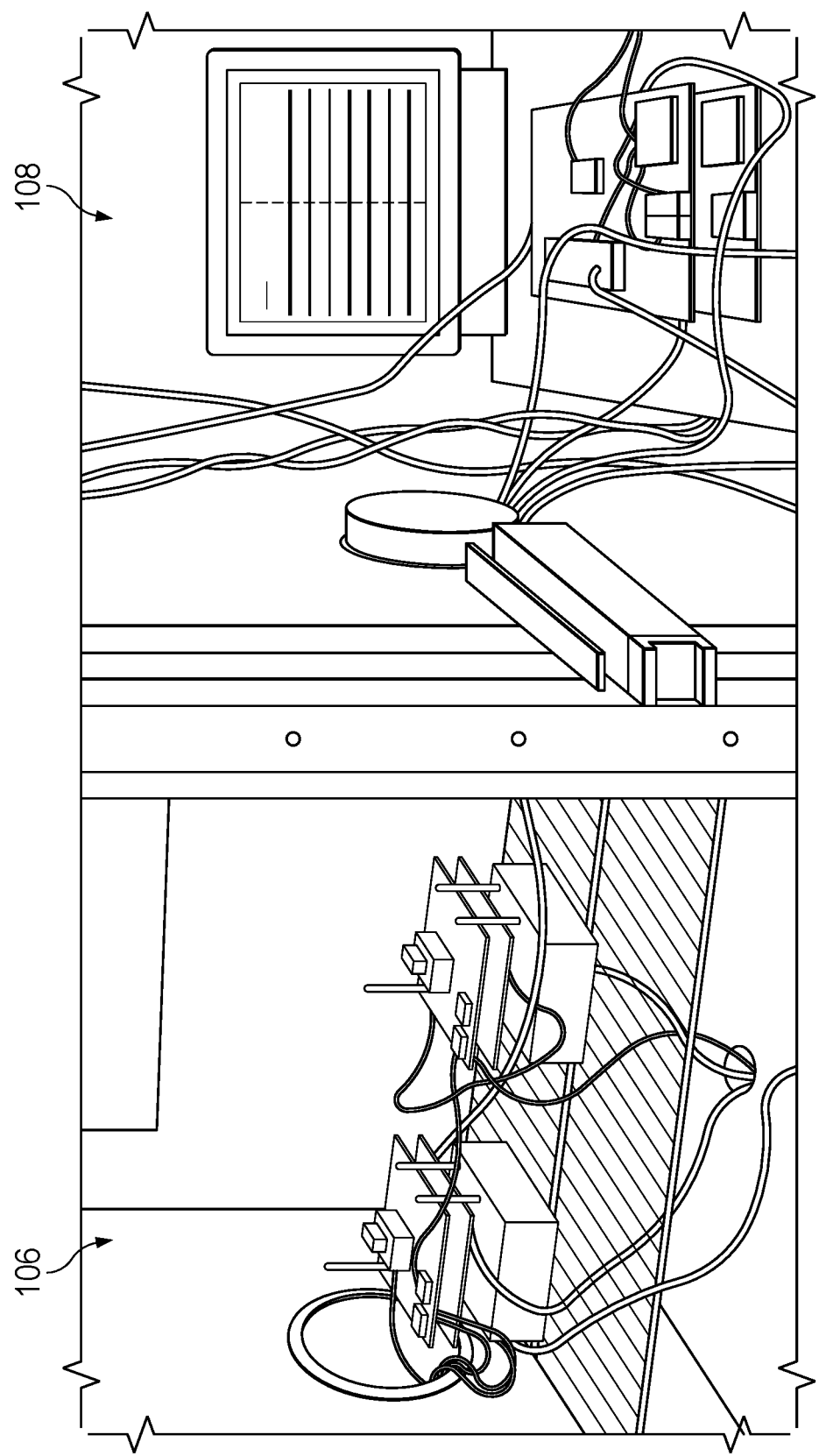

FIGS. 1A-C are diagrams 100 of an experimental test setup for FET degradation that is used to derive a dataset for the reliability evaluation, in accordance with an example embodiment of the present disclosure. Two DUTs 102 and 104 are shown degrading at the same time with 8 A DC current located in a temperature chamber 106 with 75° C. ambient temperature. Based on different mission profiles of respective applications, it is also possible to degrade DUTs 102 and 104 with different ambient temperatures under various current levels. In order to measure the lifetime of a SiC-MOSFET under controlled operating conditions, an automated data logging system was implemented in dSPACE-RTI1202 platform 108 to control the power and heat flowing in and out of the DUTs 102 and 104. The sampling time is 5 ms, and data is logging at 20 Hz frequency.

Figure 2A:
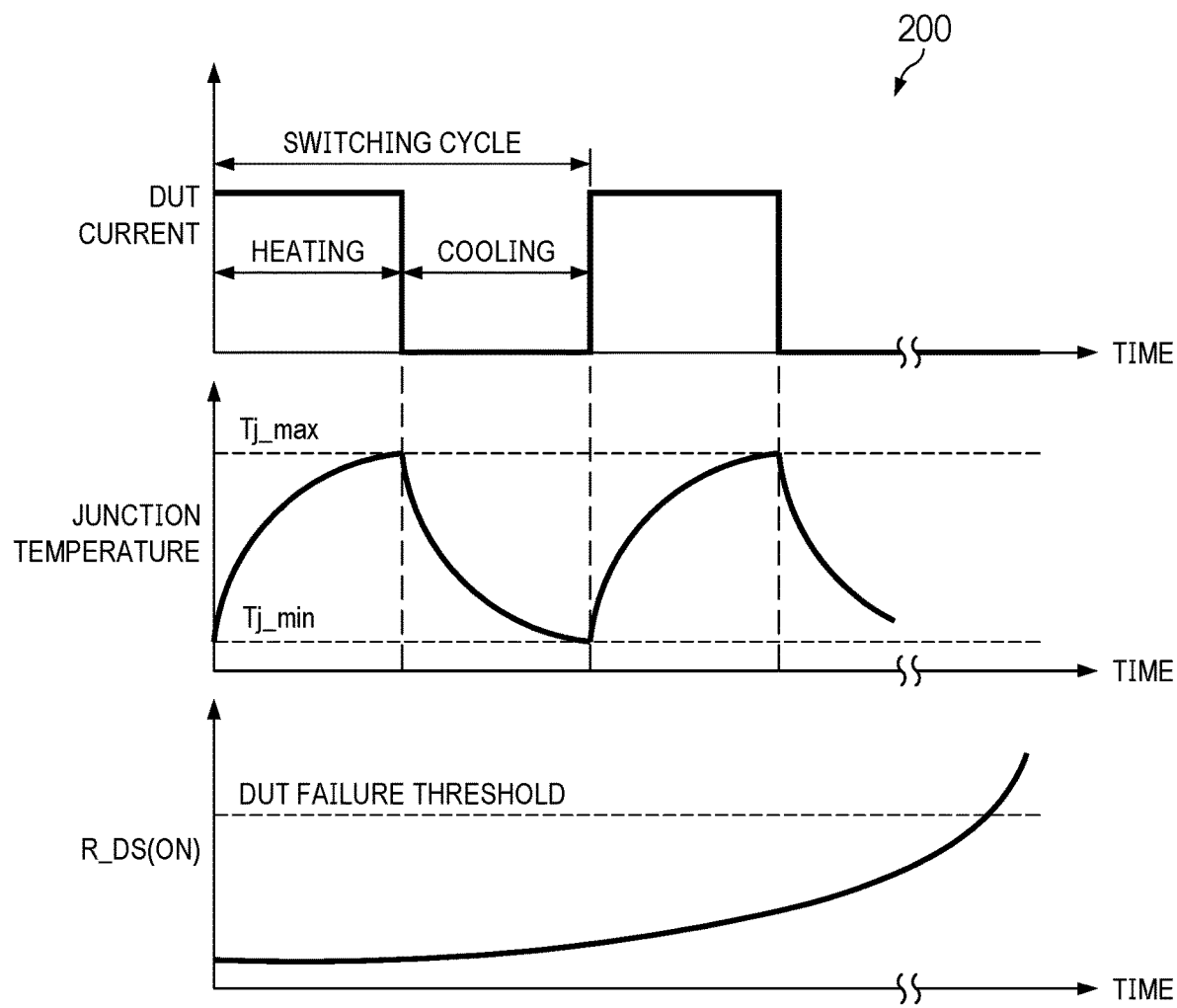
Figure 2B:
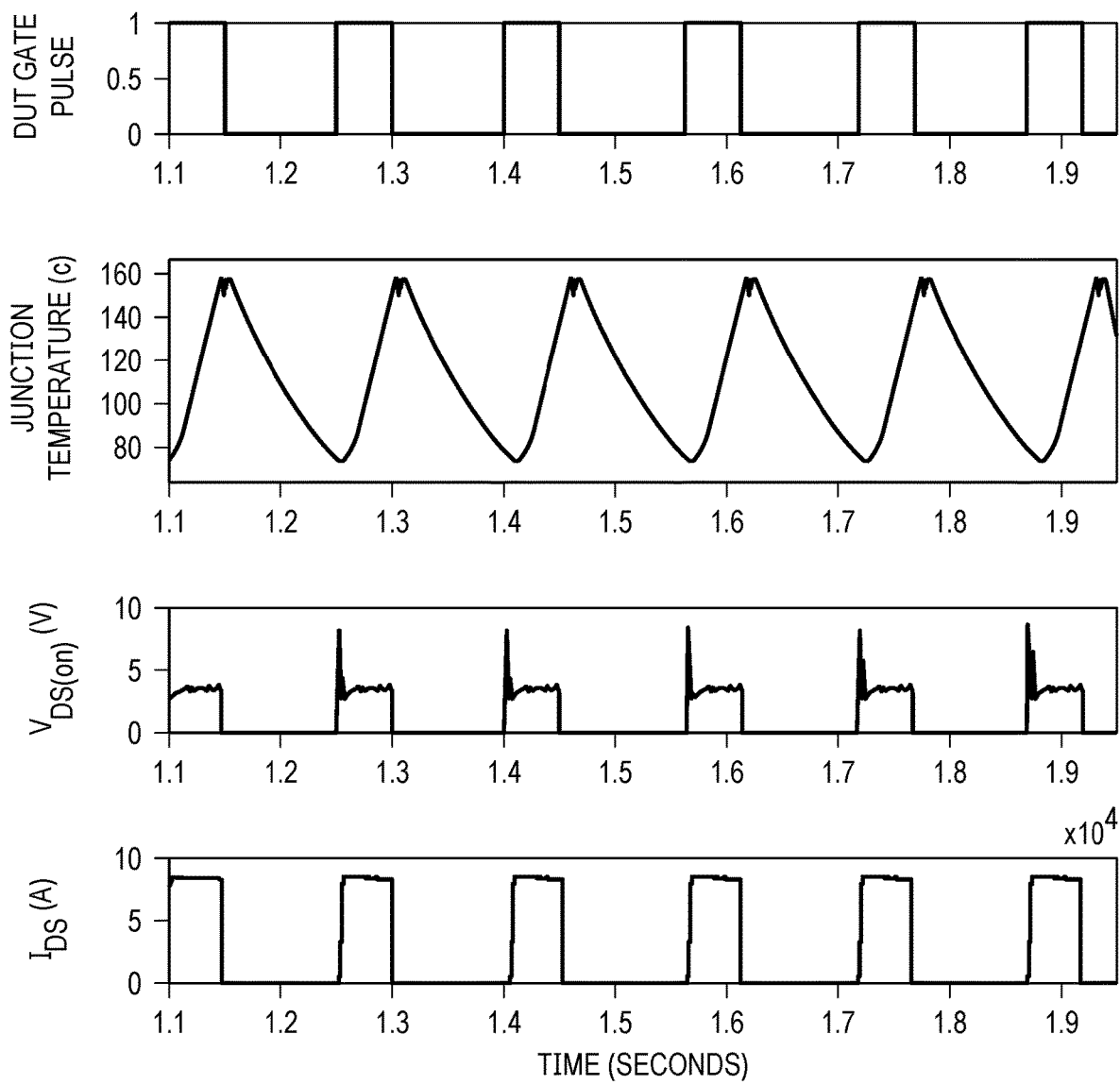

FIGS. 2A-C are diagrams 200 of waveforms in accordance with an example embodiment of the present disclosure. In FIG. 2A, the degradation cycle consists of two states, heating and cooling. In the heating state, the DUT is switched ON, and current flows through the DUT, causing its temperature to rise as a result of conduction losses. At the same time, the control system switches the current in the thermoelectric cooler (TEC), causing heat to flow into the DUT from the heat sink, and blocking the heat flow out of the device. This results in a very fast junction temperature rise in the DUT. In the cooling state, the DUT is switched OFF and current stops flowing. At the same time, the current in the thermoelectric cooler is switched reverse so that heat flows out of the DUT into the heat sink. Using a TEC in this way greatly increases the cooling speed of the DUT. During each cycle, DUT junction temperature is monitored, and controller moves from cooling state to heating state when junction temperature reaches its minimum threshold (here $T_{j\text{-}min}$ is 75° C.) and returns to cooling state when the DUT maximum junction temperature is reached (here $T_{j\text{-}max}$ is 160° C.). These maximum and minimum junction temperature thresholds are set in the control system and can be modified for each test, or even during a test, to alter the operating range of the DUT. As shown in FIG. 2A, the switching cycle will continue until $R_{DS\_ON}$ passes its failure threshold.

The experimental results of device degradation cycles along with $V_{DS(ON)}$ and Drain-Source current are shown in FIG. 2B. The accumulated estimated $R_{DS(ON)}$ for DUT is shown in FIG. 2C. Due to a large amount of data, for more clarity purposes, only initial and final variations of $R_{DS(ON)}$ are plotted. The initial value for $R_{DS(ON)}$ is almost 450 mΩ, and it reaches 720 mΩ at the end of the degradation test.

Figure 3A:
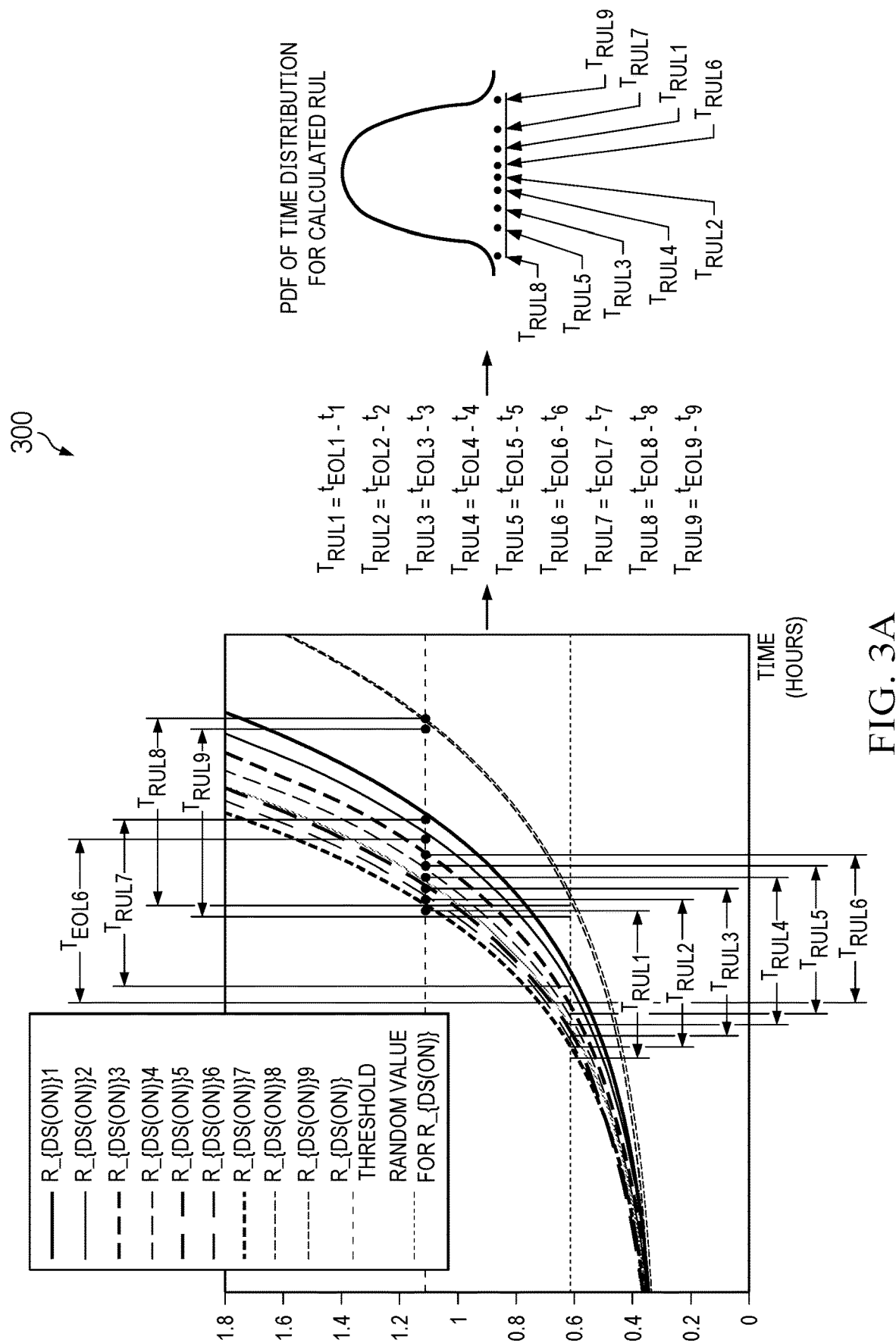
FIGS. 3A-B are diagrams of converter and datasets, in accordance with an example embodiment of the present disclosure.
Figure 3B:
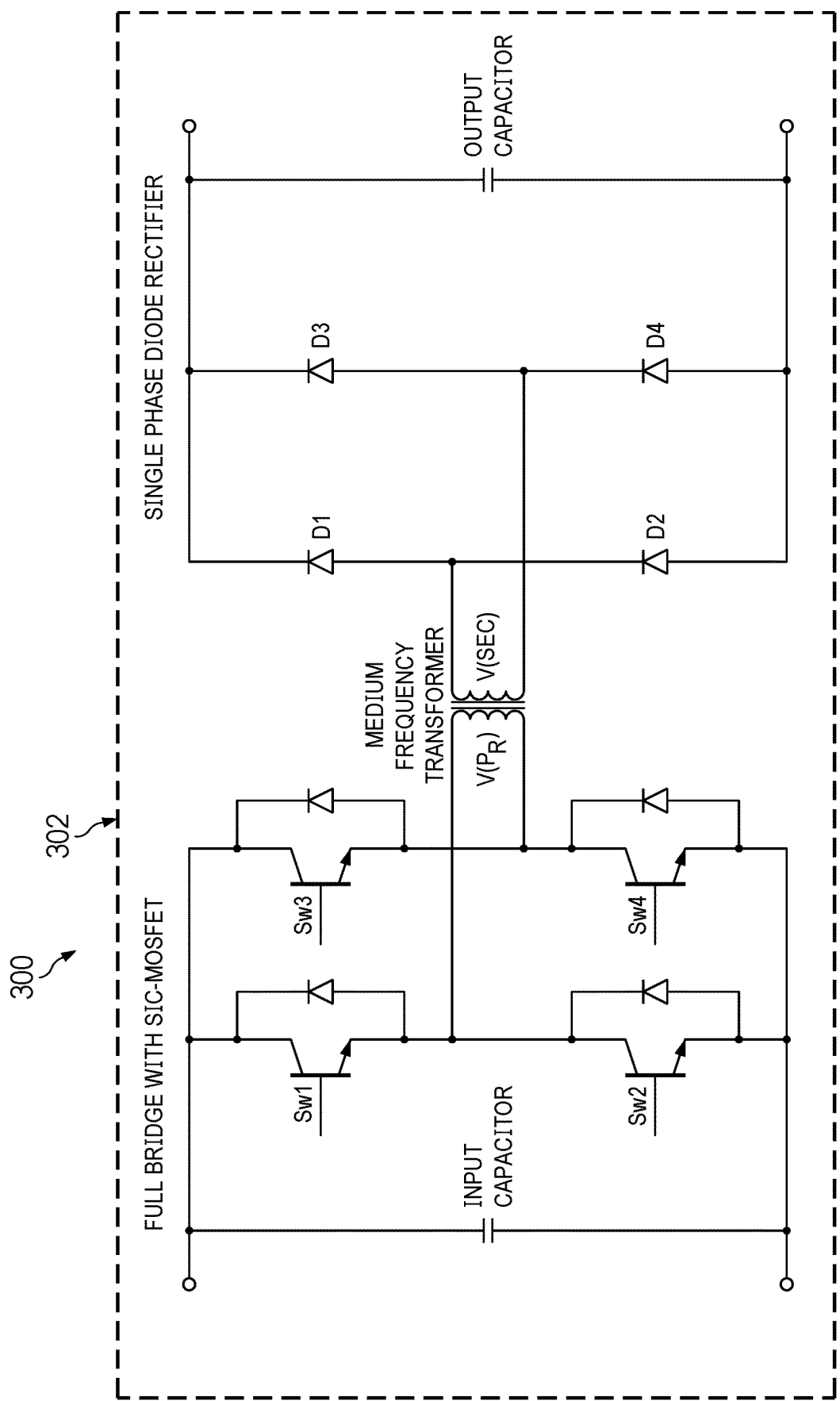

FIGS. 3A-B are diagrams 300 of converters and datasets, in accordance with an example embodiment of the present disclosure. For further component-level reliability calculation, the degradation data of $R_{DS(ON)}$ is fitted to an exponential equation ($R_{DS\_ON}=a*e^{bt}$) to model the component behavior during the operational lifetime, as shown in FIG. 3A. For device RUL estimation, at any given point in the operation run time, the time (or the number of cycles) difference between the current values to the failure value of the respective health indicators in each of the 'n' samples will be calculated. In other words, the RUL of each component is the difference between the intersections of the exponential model with a value of health indicators at the time ti and time of reaching failure threshold at $t_{EoL(i)}$ [$T_{RUL(i)}=t_{EoL(i)}-t_{(i)}$)].

For example, the FET's degradation model and calculated RUL times are shown in FIG. 3A. With a random value of $R_{DS(ON)}=0.6$ $2 and the threshold value of 1.1 (2 for the component (solid and dashed blue color lines in FIG. 3A) and considering all calculated TRUL(i) for 9 samples, the lifetime distribution for RUL (or time-to-failure distribution) can be obtained and fitted with an appropriate distribution function like Beta, Gamma or Skew normal distribution. For simplicity, a normal distribution is used to fit data in this disclosure. Therefore, RUL is represented by a probability distribution, describing the probability of the predicted RUL of the component with time. It should be noted that due to the uncertainties in the lifetime prediction, the reliability metric is usually expressed in terms of statistical values, rather than a fixed value. A similar procedure can be implemented for electrolytic capacitors based on ESR decrement to calculate the PDF of RUL. These PDF characteristics can be used in the survival measurement, which is described in the next section.

III. SYSTEM-LEVEL SURVIVAL PROBABILITY FUNCTION

Once the converter module is implemented and is under actual operation, the different system parameters need to be continuously monitored. Considering a power electronic converter with 'k' components, the whole system cannot function if any of the 'k' components fail. It means that the failure of each component results in loss of operation for the converter.

In this disclosure, an isolated DC/DC converter 302 shown in FIG. 3B is considered a system. For simplicity of analysis, it is assumed that the diodes and high-frequency transformer have a longer life than the FETs and capacitors. The parameters of the operational converter have a very high likelihood to have characteristics very similar to the ones that underwent qualification. The system-level survival index is described as follows. As described in the previous section, a set of values for 'n' samples of two major components, FET and capacitor, is provided to find the probability of RUL at any given operation time (ti). With these values, PDFs of RUL for each component can be derived in terms of "time in the future" operation, which means how much time in the future respect to present time of operation is remained for the component to be failed. Considering the isolated DC/DC converter 302 in FIG. 3B, four SiC switches, and two capacitors are used. Therefore, in this case, the corresponding PDF of RUL for these six components will be considered to evaluate the system-level survival index.

$$PDF_{survival} = \left\{ \int_0^\infty pdf_{R_{DS}1} \cdot dt - \int_0^t pdf_{R_{DS}1} \cdot dt \right\} \times \left\{ \int_0^\infty pdf_{R_{DS}2} \cdot dt - \int_0^t pdf_{R_{DS}2} \cdot dt \right\} \times$$

$$\left\{\int_0^\infty pdf_{R_{DS}3} \cdot dt - \int_0^f pdf_{R_{DS}3} \cdot dt\right\} \times \left\{\int_0^\infty pdf_{R_{DS}4} \cdot dt - \int_0^t pdf_{R_{DS}4} \cdot dt\right\} \times$$

$$\left\{\int_0^\infty pdf_{ESR1} \cdot dt - \int_0^r pdf_{ESR1} \cdot dt\right\} \times \left\{\int_0^\infty pdf_{ESR2} \cdot dt - \int_0^t pdf_{ESR2} \cdot dt\right\}$$

The effective survival probability of the converter with '6' parameters (four $R_{DS(ON)}$ and two ESRC) at a specific time 't' in the future is given by Eqn. (1), based on the combined evaluation of the areas under the RUL PDF curves. This equation can be extended to 'k' parameters for different configuration of power converter with 'k' number of critical components. From the above equation, it can be seen that the survival probability (PDF_Survival) of the converter at any given time in the future will be affected by the PDF of the most critical component(s) (ones that are most likely to fail first). However, the actual failure of any one part will constitute the failure of the system. As an example, the RUL PDFs of k=2 parameters, one $R_{DS(ON)}$ and one ESRC, were considered and derived with available degradation data (n=9 samples for SiC-MOSFET and n=9 samples for capacitor) for a random set of 'present' values for these two parameters.

Figure 4A:
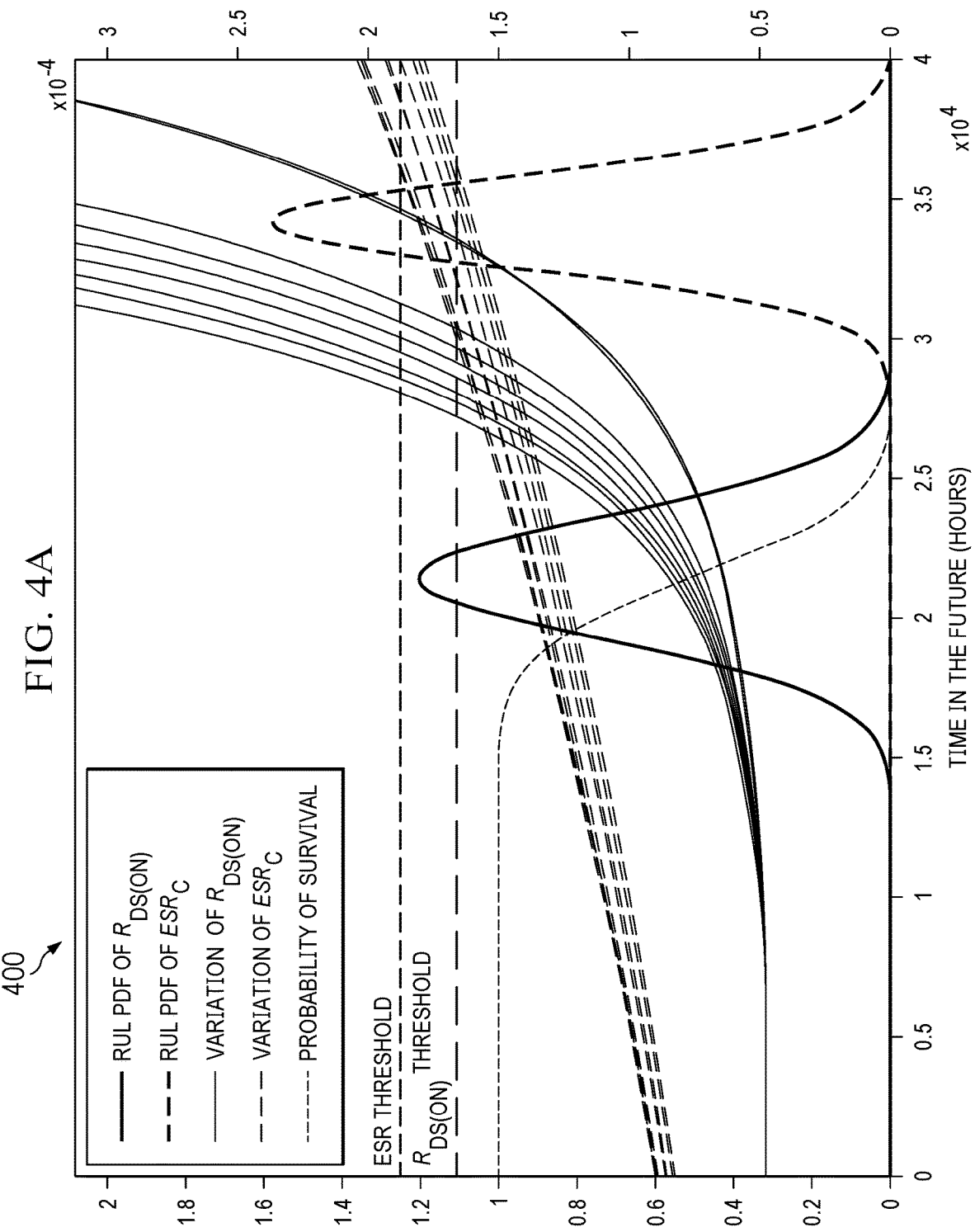
FIGS. 4A-B are diagrams of datasets, threshold values, and the RUL PDFs for components, in accordance with an example embodiment of the present disclosure.
Figure 4B:
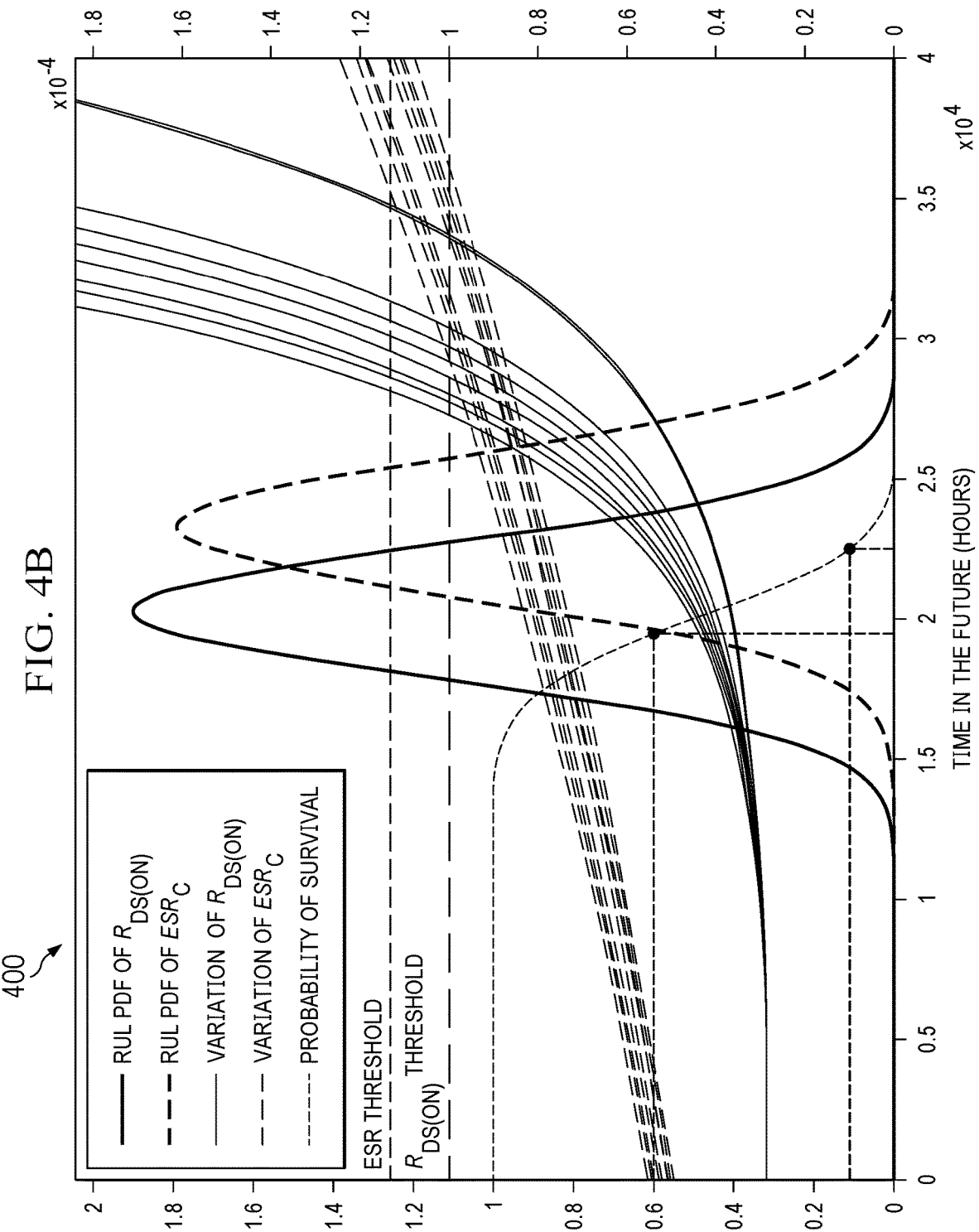

FIGS. 4A-B are diagrams 400 of a dataset, threshold values, and the RUL PDFs for components, in accordance with an example embodiment of the present disclosure. The system-level survival probability of the converter is calculated based on Eqn. (1). FIG. 4A shows the scenario where there is no overlap between the respective RUL PDFs of the two parameters, which means that the probability of survival of the overall system is determined mainly by that of the FET, which is most likely to fail much earlier than the capacitor. FIG. 4B shows the scenario with significant overlap (as will be in most practical applications involving multiple devices). From these estimates, it will be possible to extract a wide range of information. Under case (b) in FIG. 4B, there is a 60% chance (probability of 0.6) that the converter will survive for another 19,000 hours and a 10% chance that it will function for 22,000 hours, given the same conditions. Also, it can be estimated that 10% of the converter will fail after 24,000 hours. Such information will be useful for both operators and supply chain personnel to estimate when replacement parts are needed or take any urgent action to protect the system from potential damages. When the operating conditions change, the RUL estimate also adapts.

IV. PROPOSED ONLINE HEALTH-MONITORING OF POWER CONVERTERS UNDER DIFFERENT OPERATING CONDITIONS

In order to monitor the health operation of any converter in real-time mode, a machine learning algorithm is used and trained considering a large number of combinations among health indicators to cover any possibility of variation. For the converter used in this disclosure, all possibilities of variation for six health indicators, including four $R_{DS(ON)}$ of FETs and two $ESR_C$ of capacitors are changing between initial value up to failure threshold ($X_{initial\_value} < R_{DS(ON)}$ & $ESR_C < X_{threshold\_value}$). Then, the RUL PDFs of all components and survival index for the whole system (PDF_Survival) are calculated for all possible combinations of parameters.

Figure 5:
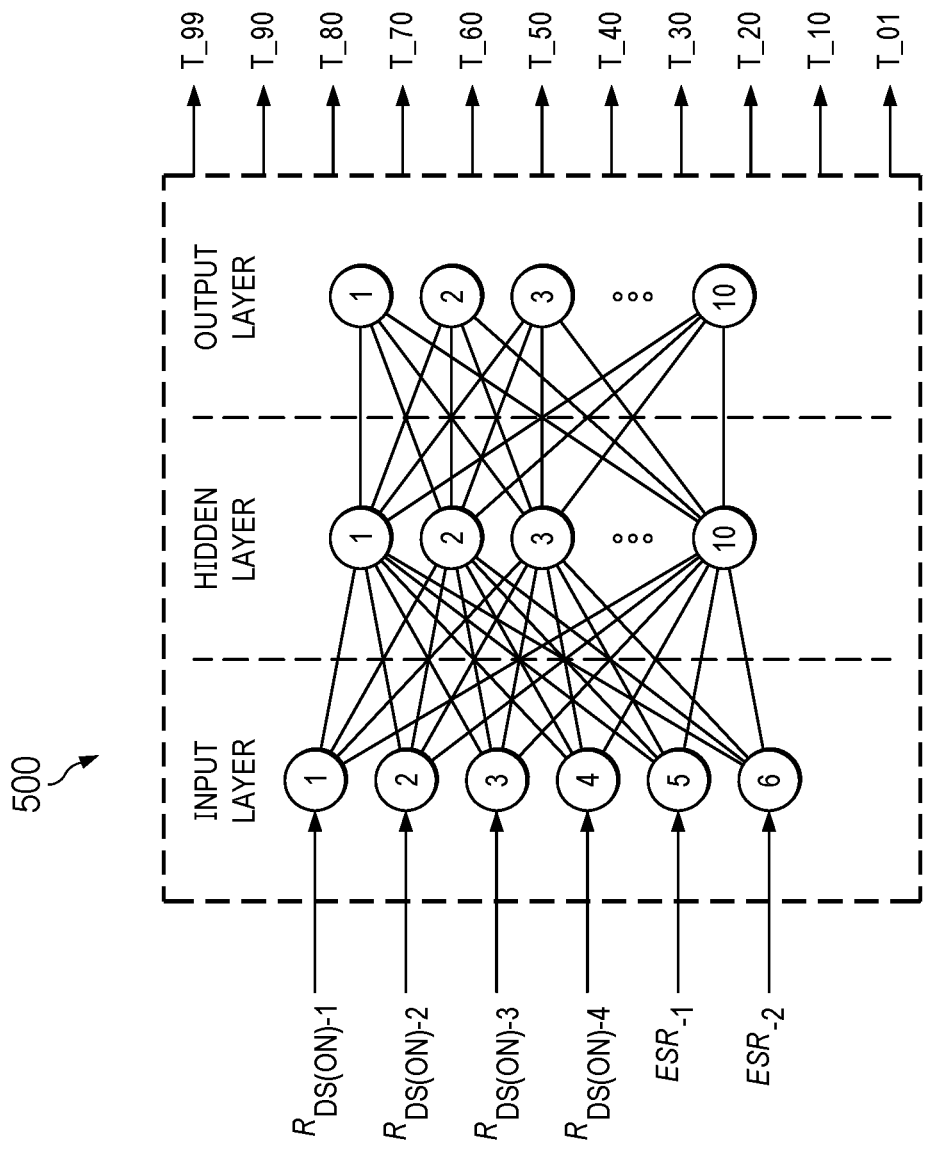
FIG. 5 is a diagram of a trained two-layer ANN for real-time RUL prediction, in accordance with an example embodiment of the present disclosure.

FIG. 5 is a diagram 500 of a trained two-layer ANN for real-time RUL prediction, in accordance with an example embodiment of the present disclosure. Using this data, an Artificial-Neural-Network (ANN) is trained to perform online health-monitoring with new incoming input data from health indicators. A two-layer backpropagation network shown in FIG. 5 with sigmoid hidden neurons and linear output neurons is implemented to fit multi-dimensional mapping. The specification of trained ANN is presented in Table I. The Levenberg-Marquardt algorithm (LMA), which is a hybrid technique that uses both Gauss-Newton and steepest descent approaches to converge to an optimal solution is used.

FIG. 6 is a diagram 600 of a lifetime indicator of survival probability ($T_{-x}$), in accordance with an example embodiment of the present disclosure. To get more understandable information, instead of getting time-series output from ANN, lifetime indicator of survival probability (T_x) is defined and used to monitor the health condition of the converter, as shown in FIG. 6 (it may be noted that it is the zoomed in region of the probability of survival plot in FIG. 4). Thus, the system-level reliability assessment is performed using time T_99 with 99% probability of survival, T_90 with 90% probability of survival, etc. The inputs of ANN are the current values of health indicators ($R_{DS(ON)}$ and $ESR_C$) in practical operation, and the outputs are the $T_{-x}$ lifetime indicator of survival index.

Figure 7A:
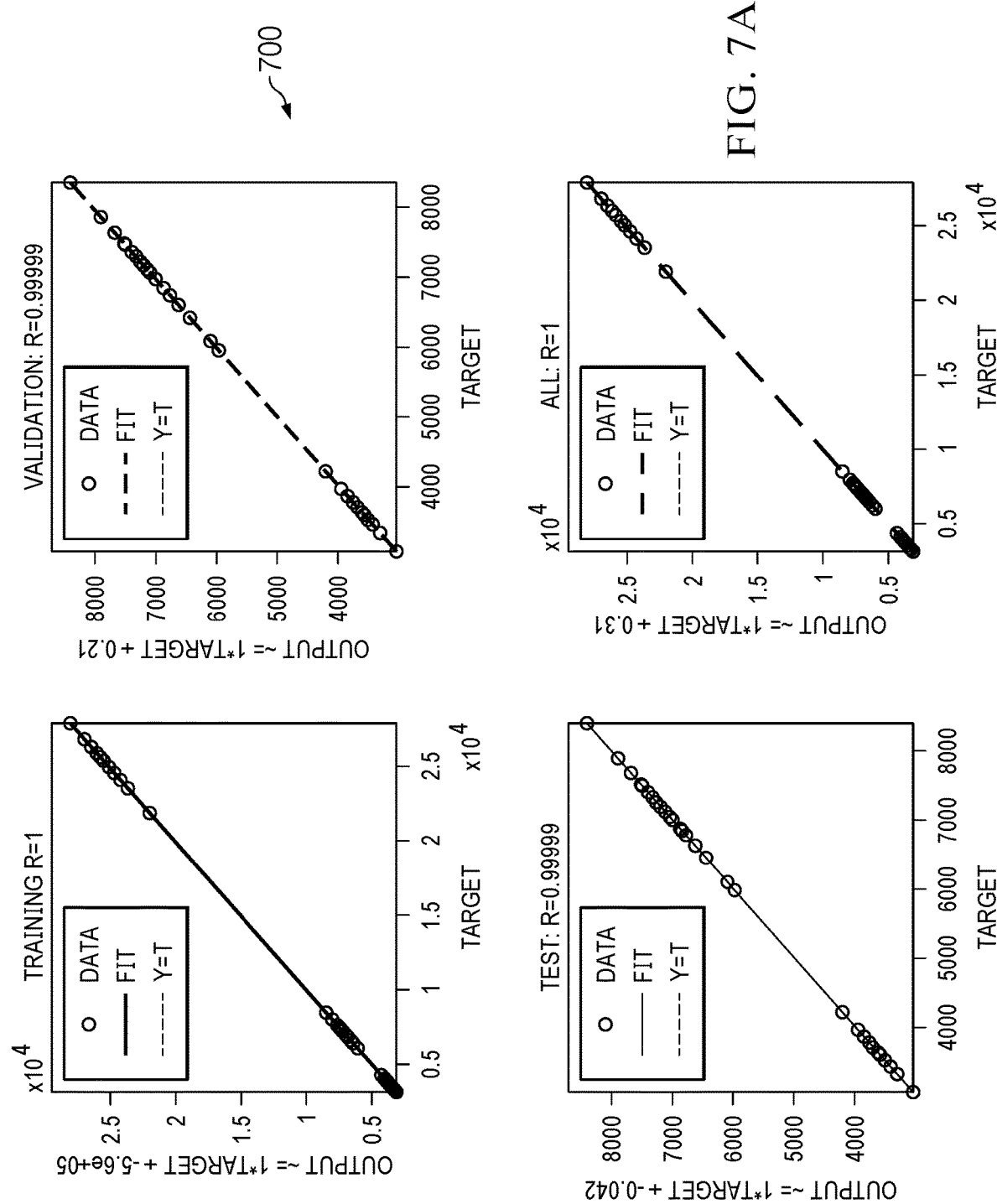
Figure 8B:
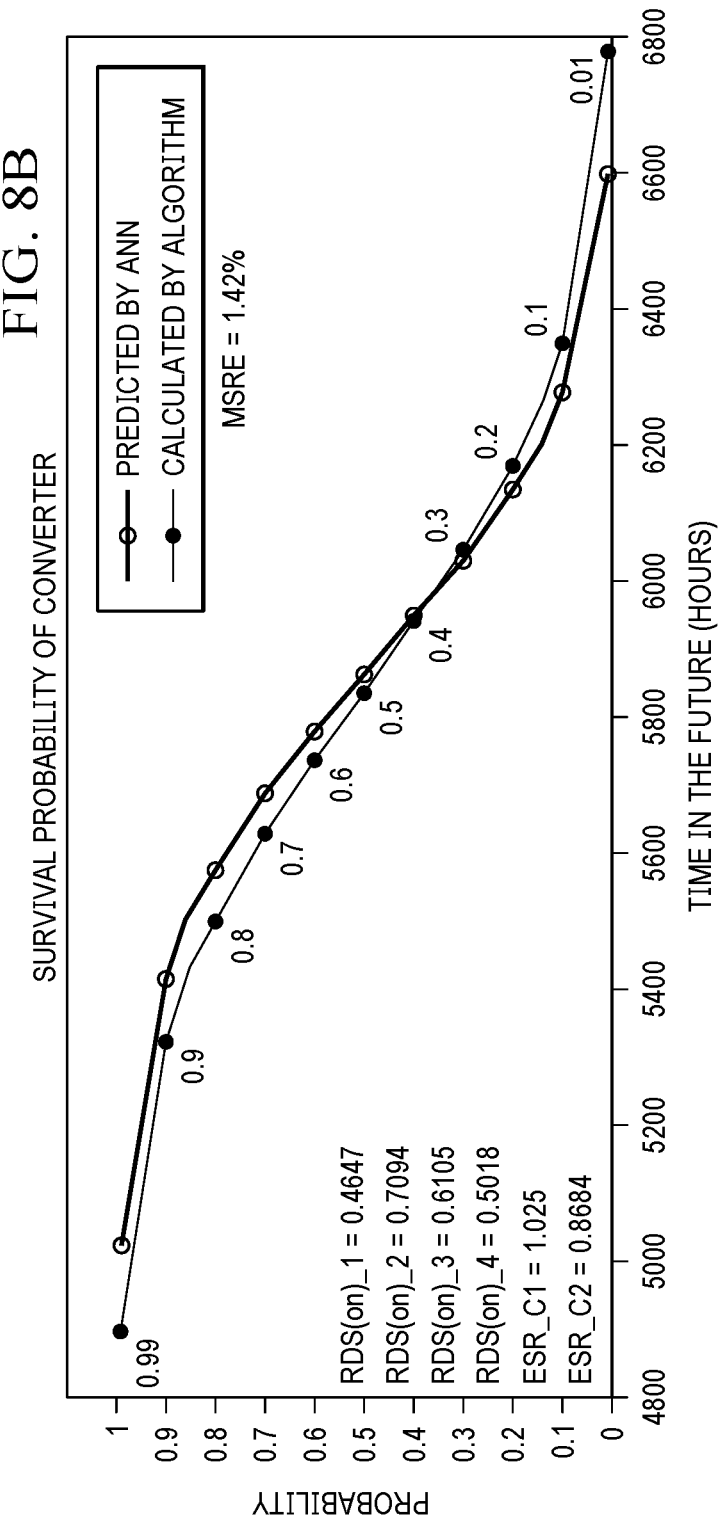
Figure 8C:
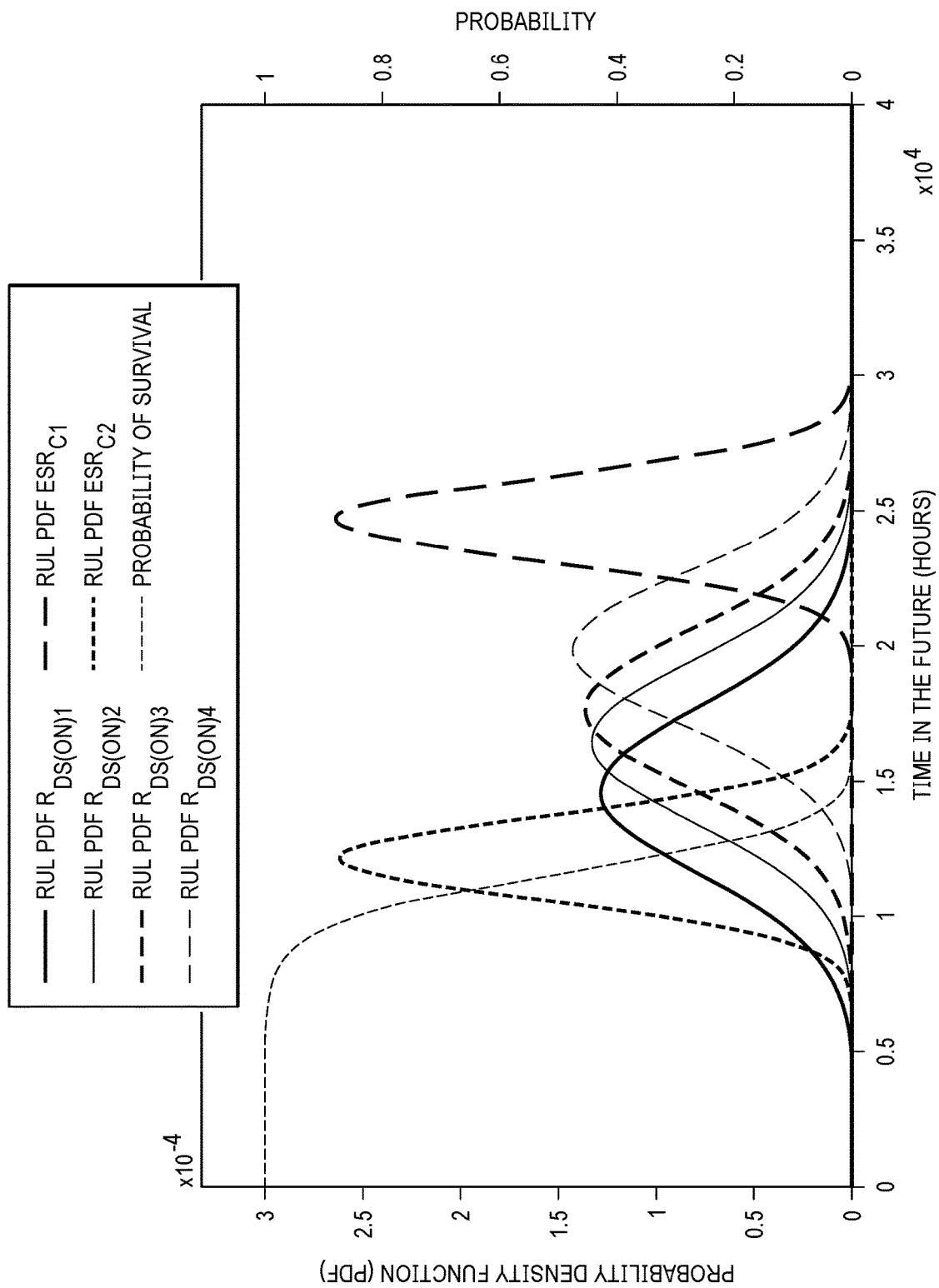
Figure 8D:
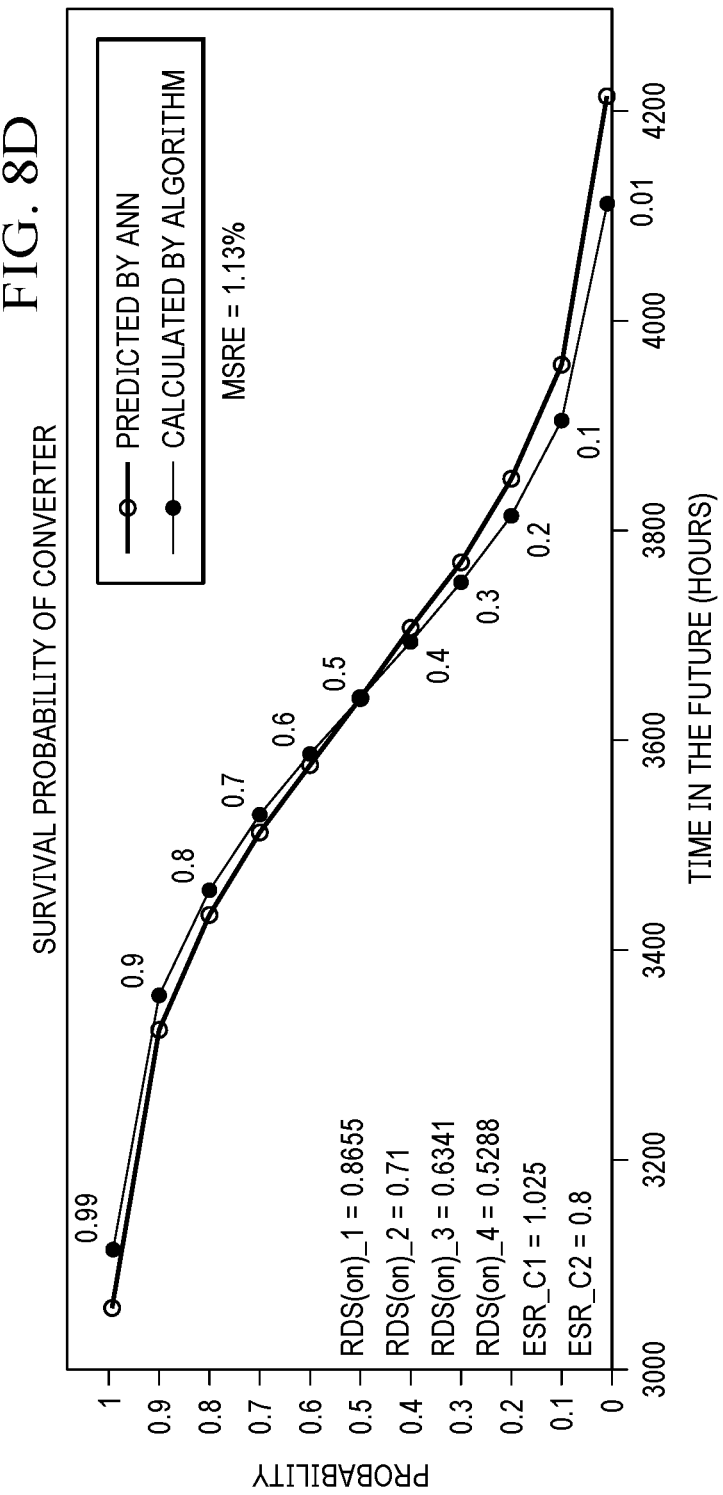
Figure 8E:
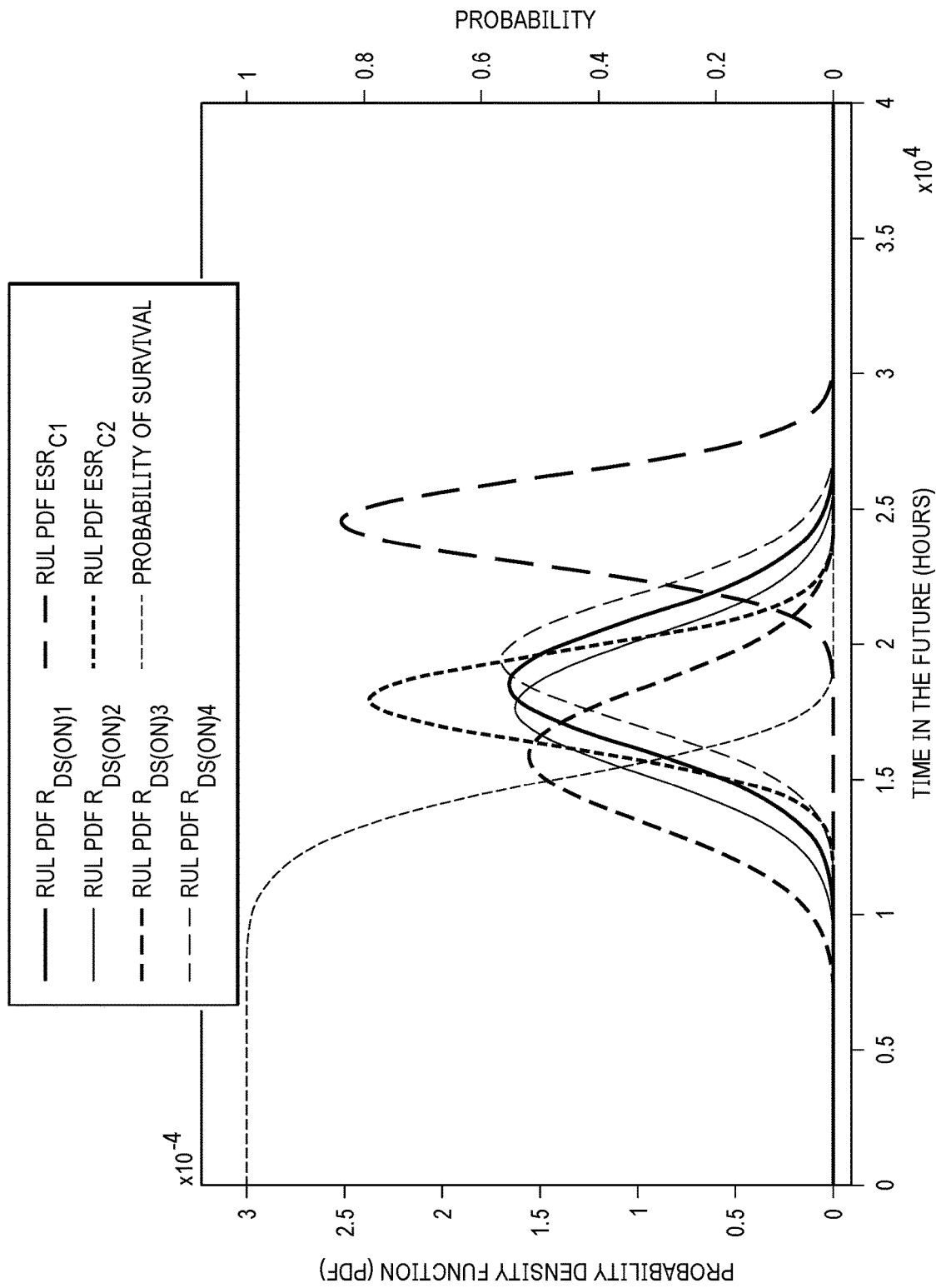
Figure 8F:
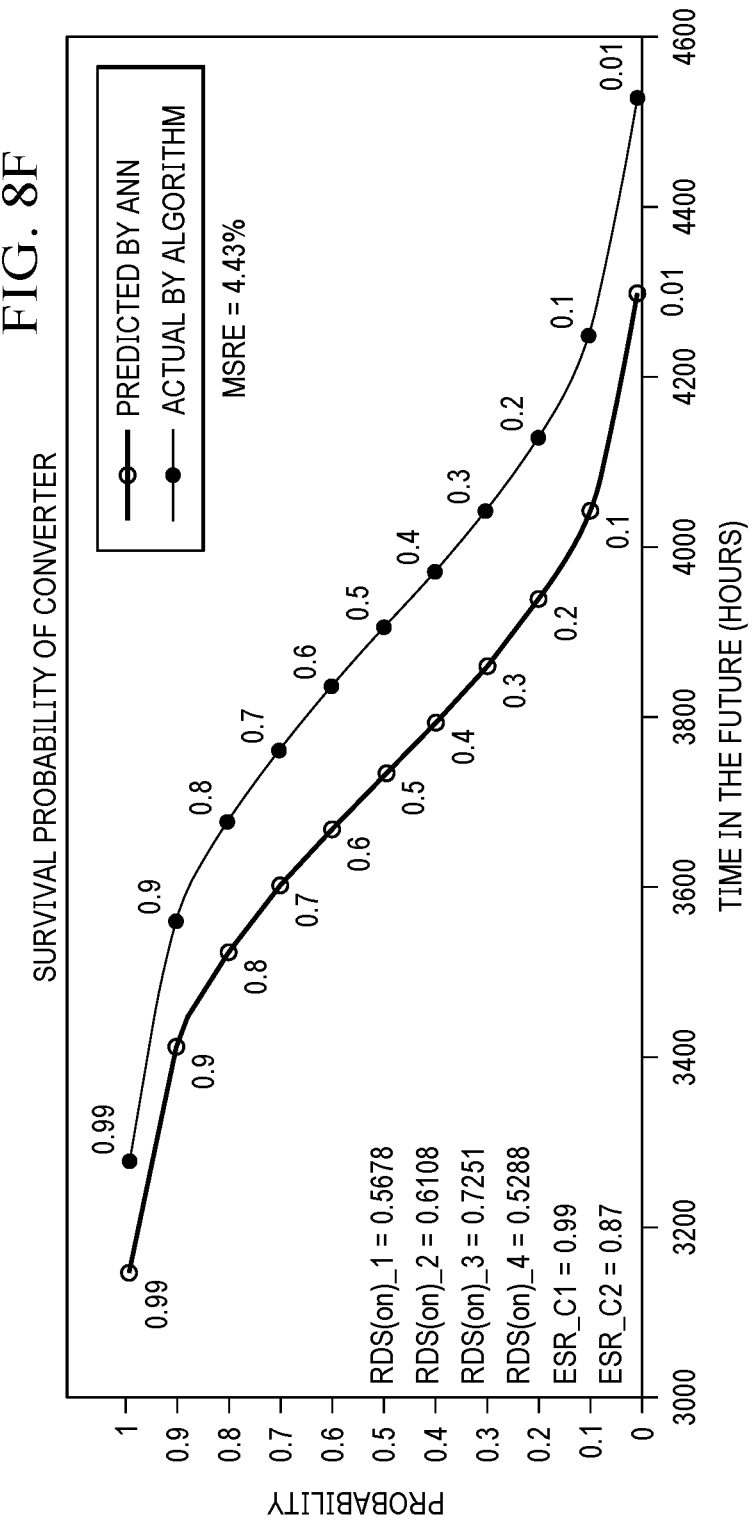

FIGS. 7A-B are diagrams 700 of an evaluation process from training/test data for the trained ANN, in accordance with an example embodiment of the present disclosure. FIG. 7A shows the regression plot from training, validation, and testing data set, with an excellent R-value of close to 1. From FIG. 7B can be seen that the mean-square error histogram has a single long bar, which means the error value is very close to zero. When the MSE reaches 0.043, and the minimization has converged. It is clear that by taking more data points in the training set, the curve estimation can be further improved, while it may take a longer time to arrive at the model.

To evaluate the performance of the trained ANN, a vector of new values of health indicators (four $R_{DS(ON)}$ and two $ESR_C$) are chosen and sent to ANN, and the output of ANN is captured as predicted system-level survival probability. Table II shows one condition of input and output for ANN. For example, for input values of 0.35, 0.4655, 0.4286 and 0.3609 ohms for four $R_{DS(ON)}$ and values of 0.65 and 1.025 ohms for two $ESR_C$, since $T_{-99}$ is equal to 10909.7, it can be said that with 99% of probability, that the DC/DC converter will work for 10909.7 hours until its end of useful life (EoL). As an operator's point of view, knowing different time interval indexes (T_99, . . . , T_01) can help to make a further decision regarding doing required maintenance or replacement in power converters, which results in reducing periodic maintenance costs without having enough information of time in the future operation.

FIGS. 8A-F are diagrams showing three different comparisons between calculated survival probability by the proposed algorithm and predicted survival probability for a converter with the trained ANN, respectively, with different values for $R_{DS(ON)}$ and ESRs. In each possible combination of health indicator values, the RUL PDF graphs and the probability of survival are plotted along with calculated and predicted time interval indexes. Also, the calculated Mean-Square-Root-Error (MSRE) shows the high precision prediction of trained ANN, which is crucial for sensitive applications like downhole oil and gas, defense applications, aerospace, etc. It is shown (in a zoomed-in graph) that in the context of 100,000 hours of operation of converters, the worst-case error is less than 200 hours (<0.2%).

TABLE II

The evaluation of trained ANN for six random values of power SiC switches and capacitors

| ANN Inputs-health indicators ($\Omega$) | | | | | |
|---|---|---|---|---|---|
| $R_{DS(ON)}1$ | $R_{DS(ON)}2$ | $R_{DS(ON)}3$ | $R_{DS(ON)}4$ | $ESR_{C1}$ | $ESR_{C2}$ |
| 0.35 | 0.4655 | 0.4286 | 0.3609 | 1.025 | 0.65 |

| ANN Outputs-time interval indexes (Hours) | | | | | | | | | |
|---|---|---|---|---|---|---|---|---|---|
| $T_{\_99}$ | $T_{\_90}$ | $T_{\_80}$ | $T_{\_70}$ | $T_{\_60}$ | $T_{\_50}$ | $T_{\_40}$ | $T_{\_30}$ | $T_{\_20}$ | $T_{\_10}$ $T_{\_01}$ |
| 10909.7 | 11739.8 | 12069.2 | 12299.6 | 12492.2 | 12668.4 | 12842.0 | 13024.4 | 13234.2 | 13518.8 14175.7 |

Figure 9A:
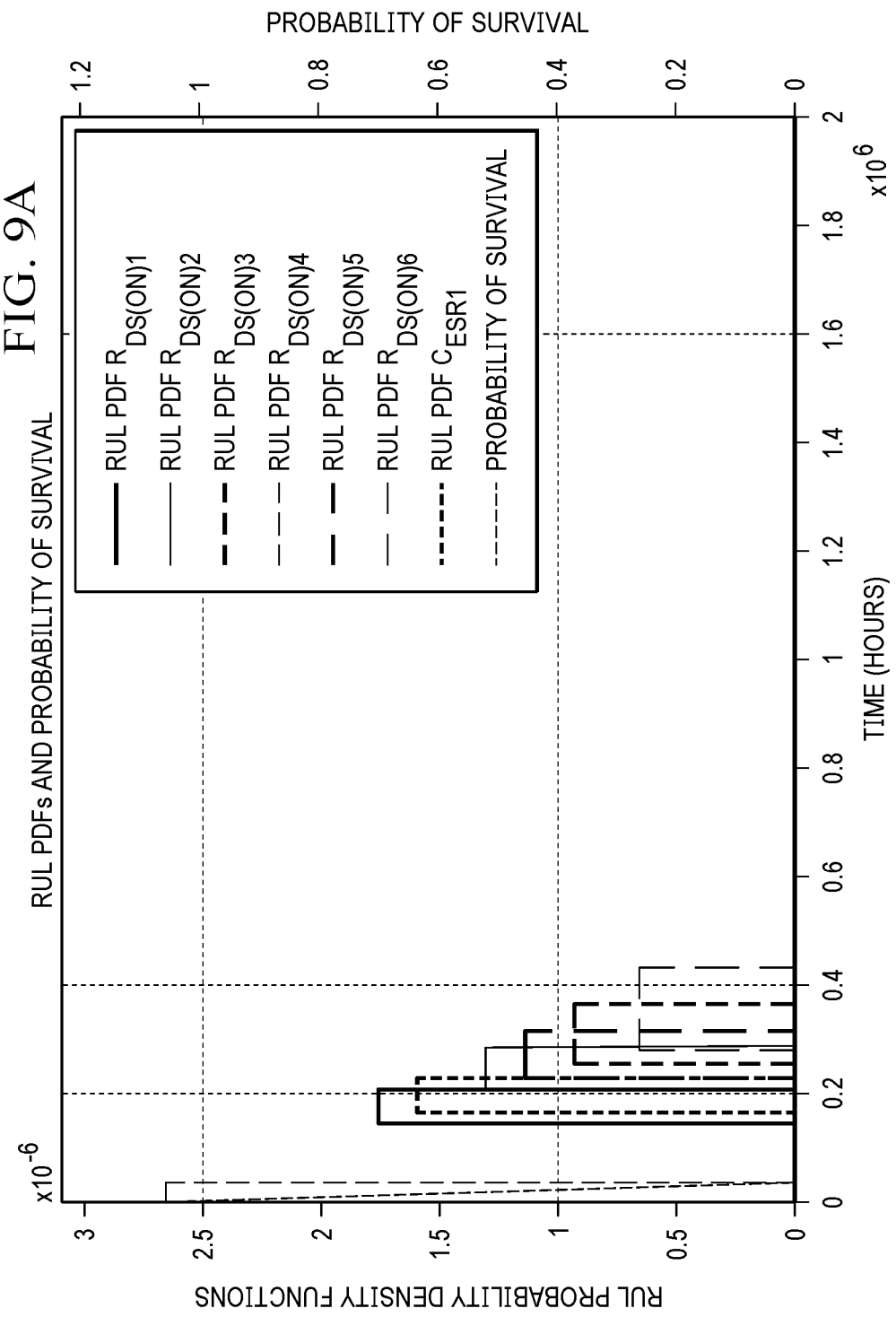
FIGS. 9A-B show the survival probability by the proposed algorithm under the scenario of four FETs along with two capacitors in the power electronics converter, and also assuming uniform distribution for probability density function.
Figure 9B:
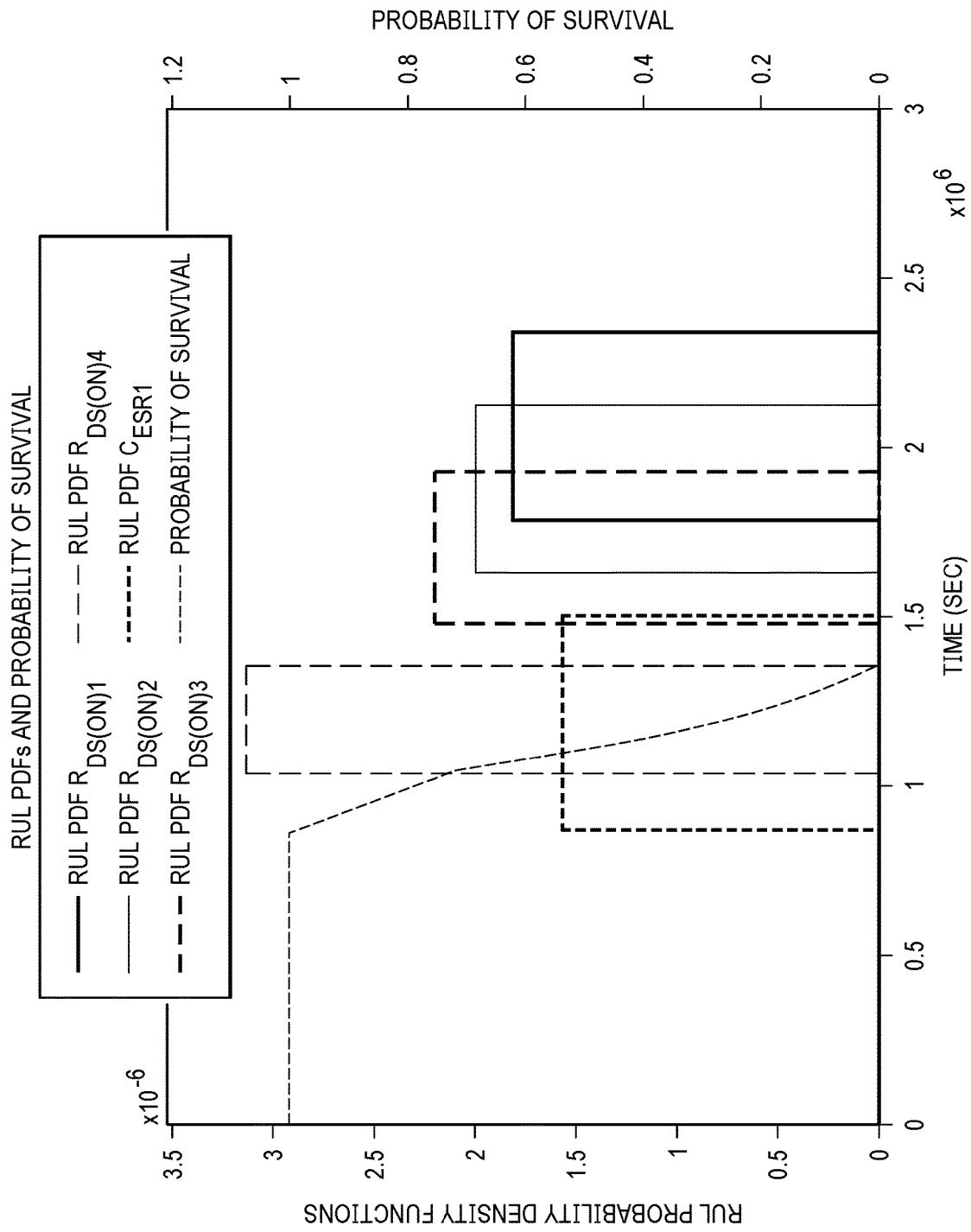

FIGS. 9A-B are diagrams 900 showing the survival probability by the proposed algorithm under the scenario of four FETs along with one capacitor in the power electronics converter, and also assuming uniform distribution for probability density function.

V. CONCLUSION

A statistical system and method to predict the probability of survival for power converters based on the measured data of component level degradation (qualification) and using machine learning is disclosed. An experimental hardware setup for device degradation test and system-level RUL measurement is provided. This approach aims to estimate the probability of survival for a converter by predicting the RUL of all the critical power components in the system. The main advantage of the proposed technique is that it uses real degradation data to estimate both component-level and system-level RUL indices, which results in increased precision and feasibility of the proposed approach. Moreover, since the machine learning-based algorithm is light in computational memory usage, it can be implemented on GPUs, FPGAs or ASICs. The disclosed system and method can gain further traction to be implemented in modern concepts, including digital twins. A degradation circuit set-up to achieve a precise measurement, considering the noise during fast switching operation of the SiC-FETs, is also suggested in this disclosure for $R_{DS(ON)}$ measurement.

REFERENCES

The following documents and publications are hereby incorporated by reference.

[1] H. Wang, K. Ma, and F. Blaabjerg, "Design for reliability of power electronic systems," in Proc. IEEE 38th Annu. Conf. Ind. Electron. Soc., 2012, pp. 33-44.

[2] E. Wolfgang, "Examples for failures in power electronics systems," presented at ECPE Tuts. Rel. Power Electron. Syst., Nuremberg, Germany, April 2007.

[3] S. Yang, A. T. Bryant, P. A. Mawby, D. Xiang, L. Ran, and P. Tavner, "An industry-based survey of reliability in power electronic converters," IEEE Trans. Ind. Appl., vol. 47, no. 3, pp. 1441-1451 May/June 2011.

[4] M. Biglarbegian et al., "On condition monitoring of high frequency power GaN converters with adaptive prognostics," in 2018 IEEE Applied Power Electronics Conference and Exposition (APEC), 2018: IEEE, pp. 1272-1279.

[5] F. Erturk, E. Ugur, J. Olson, and B. Akin, "Real-Time Aging Detection of SiC MOSFETs," IEEE Transactions on Industry Applications, vol. 55, no. 1, pp. 600-609, 2018.

[6] K. Medjaher, D. A. Tobon-Mejia, and N. Zerhouni, "Remaining useful life estimation of critical components with application to bearings," IEEE Transactions on Reliability, vol. 61, no. 2, pp. 292-302, 2012.

[7] Gupta, Anunay, et al. "A Review of Degradation Behavior and Modeling of Capacitors." International Electronic Packaging Technical Conference and Exhibition. Vol. 51920. American Society of Mechanical Engineers, 2018.

[8] A. M. R. Amaral and A. J. M. Cardoso, "An Experimental Technique for Estimating the ESR and Reactance Intrinsic Values of Aluminum Electrolytic Capacitors," 2006 IEEE Instrumentation and Measurement Technology Conference Proceedings, Sorrento, 2006, pp. 1820-1825.

[9] K. Laadjal, M. Sahraoui, A. J. M. Cardoso and A. M. R. Amaral, "Online Estimation of Aluminum Electrolytic-Capacitor Parameters Using a Modified Prony's Method," in IEEE Transactions on Industry Applications, vol. 54, no. 5, pp. 4764-4774 September-October 2018.

[10] L. Ren, C. Gong and Y. Zhao, "An Online ESR Estimation Method for Output Capacitor of Boost Converter," in IEEE Transactions on Power Electronics, vol. 34, no. 10, pp. 10153-10165, October 2019.

[11] S. Bęczkowski, P. Ghimre, A. R. de Vega, S. Munk-Nielsen, B. Rannestad and P. Thøgersen, "Online Vce measurement method for wear-out monitoring of high power IGBT modules," 2013 15th European Conference on Power Electronics and Applications (EPE), Lille, 2013, pp. 1-7.

[12] S. Dusmez, H. Duran, and B. Akin, "Remaining useful lifetime estimation for thermally stressed power MOSFETs based on on-state resistance variation," IEEE Transactions on Industry Applications, vol. 52, no. 3, pp. 2554-2563, 2016.

[13] D. J. DeVoto, J. Major, A. Gupta, and O. P. Yadav, "A Review of Degradation Behavior and Modeling of Capacitors," National Renewable Energy Lab. (NREL), Golden, CO (United States), 2018.

[14] Levenberg, K., 1944. A method for the solution of certain non-linear problems in least squares. Quarterly of applied mathematics, pp. 164 168.

[15] R. W. Erickson, and D. Maksimović (2001), "Fundamentals of power electronics", Kluwer Academic

[16] R. D. Middlebrook and S. Cuk, "A general unified approach to modelling switching-converter power stages," 1976 IEEE Power Electronics Specialists Conference, Cleveland, OH, 1976

[17] E. Van Dijk, J. N. Spruijt, D. M. O'Sullivan and J. B. Klaassens, "PWM-switch modeling of DC-DC converters," in IEEE Transactions on Power Electronics, vol. 10, November 1995

[18] S. Yang, D. Xiang, A. Bryant, P. Mawby, L. Ran and P. Tavner, "Condition Monitoring for Device Reliability in Power Electronic Converters: A Review," in IEEE Transactions on Power Electronics, vol. 25, no. 11, November 2010

[19] S. Vazquez et al., "Model Predictive Control: A Review of Its Applications in Power Electronics," in IEEE Industrial Electronics Magazine, vol. 8, no. 1, March 2014

[20] M. Schluse et al., "Experimentable Digital Twins-Streamlining Simulation-Based Systems Engineering for Industry 4.0," in IEEE Transactions on Industrial Informatics, vol. 14, no. 4, April 2018:

[21] S. Peyghami, Z. Wang and F. Blaabjerg, "A Guideline for Reliability Prediction in Power Electronic Converters," in IEEE Transactions on Power Electronics, vol. 35, no. 10, pp. 10958-10968, October 2020

[22] Y. Zhang, H. Wang, Z. Wang, F. Blaabjerg and M. Saeedifard, "Mission Profile-Based System-Level Reliability Prediction Method for Modular Multilevel Converters," in IEEE Transactions on Power Electronics, vol. 35, no. 7, pp. 6916-6930 Jul. 2020

[23] K. Ma, U. Choi and F. Blaabjerg, "Prediction and Validation of Wear-Out Reliability Metrics for Power Semiconductor Devices With Mission Profiles in Motor Drive Application," in IEEE Transactions on Power Electronics, vol. 33, no. 11, pp. 9843-9853 Nov. 2018.

What is claimed is:

1. A method for estimating a remaining lifetime of an electronic component, comprising:
   measuring a circuit parameter for a circuit component at a plurality of different stressors;
   determining a probability density function (PDF) of remaining life as a function of time for the circuit component and the measured circuit parameter at the plurality of different stressors; and
   combining the PDF of failure for the circuit component with at least one additional PDF of remaining life as a function of a circuit that contains the circuit component.

2. The method of claim 1 wherein measuring the circuit parameter for the circuit component at the plurality of different stressors comprises measuring a plurality of circuit parameters for the circuit component.

3. The method of claim 1 wherein measuring the circuit parameter for the circuit component at the plurality of different stressors comprises measuring the circuit parameter for a plurality of circuit components.

4. The method of claim 1 wherein measuring the circuit parameter for the circuit component at the plurality of different stressors comprises measuring a plurality of circuit parameters for a plurality of circuit components.

5. The method of claim 1 wherein determining the PDF of remaining life as the function of time for the circuit component comprises determining a PDF of remaining life as the function of time for each of a plurality of circuit components.

6. The method of claim 1 wherein combining the PDF of remaining life for the circuit component with at least one additional PDF of remaining life as the function of a circuit that contains the circuit component comprises combining the PDF of remaining life for the circuit component with at least one additional PDF of failure for a second circuit component as the function of a circuit that contains the circuit component and the second circuit component.

7. The method of claim 1 wherein combining the PDF of remaining life for the circuit component with at least one additional PDF of failure as the function of a circuit that contains the circuit component comprises combining the PDFs of remaining life for each of a plurality of circuit components as a function of a circuit that contains the plurality of circuit components.

8. The method of claim 1 further comprising generating a probability of failure (or probability of survival) for the circuit using the combined PDFs of remaining life for each of the plurality of circuit components.

9. The method of claim 1 wherein the circuit parameter is an internal resistance of the circuit component.

10. A system for estimating a remaining lifetime of an electronic component, comprising:
    a processor configured to operate under control of one or more algorithms that cause the processor to perform the steps of:
    measuring a circuit parameter for a circuit component at a plurality of different stressors;
    determining a probability density function (PDF) of remaining life as a function of time for the circuit component and the measured circuit parameter at the plurality of different stressors; and
    combining the PDF of remaining life for the circuit component with at least one additional PDF of remaining life as a function of a circuit that contains the circuit component.

11. The system of claim 10 wherein measuring the circuit parameter for the circuit component at the plurality of different stressors comprises measuring a plurality of circuit parameters for the circuit component.

12. The system of claim 10 wherein measuring the circuit parameter for the circuit component at the plurality of different stressors comprises measuring the circuit parameter for a plurality of circuit components.

13. The system of claim 10 wherein measuring the circuit parameter for the circuit component at the plurality of different stressors comprises measuring a plurality of circuit parameters for a plurality of circuit components.

14. The system of claim 10 wherein determining the PDF of remaining life as the function of time for the circuit component comprises determining a PDF of remaining life as the function of time for each of a plurality of circuit components.

15. The system of claim 10 wherein combining the PDF of remaining life for the circuit component with at least one additional PDF of remaining life as the function of a circuit that contains the circuit component comprises combining the PDF remaining life for the circuit component with at least one additional PDF of remaining life for a second circuit component as the function of a circuit that contains the circuit component and the second circuit component.

16. The system of claim 10 wherein combining the PDF of remaining life for the circuit component with at least one additional PDF of remaining life as the function of a circuit that contains the circuit component comprises combining the PDFs of failure for each of a plurality of circuit components as a function of a circuit that contains the plurality of circuit components.

17. The system of claim 10 further comprising generating a PDF of remaining life for the circuit using the combined PDFs of remaining life for each of the plurality of circuit components.

18. The system of claim 10 wherein the circuit parameter is an internal resistance, or temperature or certain voltages, or the thermal time constant of the circuit component.

19. The system of claim 10 further comprising machine learning-assisted methods for in-situ implementation.

\* \* \* \* \*

UNITED STATES PATENT AND TRADEMARK OFFICE
CERTIFICATE OF CORRECTION

Page 1 of 1

PATENT NO. : 12,442,851 B2
APPLICATION NO. : 17/961803
DATED : October 14, 2025
INVENTOR(S) : Harish Krishnamoorthy et al.

It is certified that error appears in the above-identified patent and that said Letters Patent is hereby corrected as shown below:

In the Specification

1. In Column 1, Lines 12-21, delete "STATEMENT OF GOVERNMENT RIGHTS
This invention was made in the performance of a Cooperative Research and Development Agreement with the Naval Surface Warfare Center, Crane Division (NCRADA-NSWCCD-18-292). The Government of the United States has certain rights in the invention pursuant to Contract No. W52P1J-20-9-3005 between the Department of the Navy and the University of Houston-Cullen College of Engineering." and insert -- STATEMENT REGARDING FEDERALLY SPONSORED RESEARCH OR DEVELOPMENT
This invention was made with government support under grant number R01 NS087224 awarded by the National Institutes of Health. The government has certain rights in the invention. --, therefor.

2. In Column 2, Line 53, delete "(SIC)" and insert -- (SiC) --, therefor.

3. In Column 6, Line 4, delete "($R_{DS(ON)}$" and insert -- ($R_{DS(ON)}$) --, therefor.

4. In Column 8, Line 9, delete "[$T_{RUL(i)}=t_{EoL(i)}-t_{(i)}$)]." and insert -- [$T_{RUL(i)}=t_{EoL(i)}-t_{(i)}$]. --, therefor.

5. In Column 8, Line 12, delete "$2 and" and insert -- $\Omega$ and --, therefor.

6. In Column 8, Line 12, delete "1.1 (2" and insert -- 1.1 $\Omega$ --, therefor.

Signed and Sealed this
Ninth Day of December, 2025

John A. Squires
*Director of the United States Patent and Trademark Office*